(12) United States Patent
Barsumian

(10) Patent No.: US 6,293,216 B1
(45) Date of Patent: Sep. 25, 2001

(54) SURFACE EFFECT SHIP (SES) HULL CONFIGURATION HAVING IMPROVED HIGH SPEED PERFORMANCE AND HANDLING CHARACTERISTICS

(76) Inventor: Bruce R. Barsumian, 459 Hampton Cir., Cookeville, TN (US) 38501

( * ) Notice: Subject to any disclaimer, the term of this patent is extended or adjusted under 35 U.S.C. 154(b) by 0 days.

(21) Appl. No.: 09/441,430

(22) Filed: Nov. 16, 1999

(51) Int. Cl.⁷ ........................................................ B63B 1/34
(52) U.S. Cl. .................... 114/67 A; 114/289; 114/290
(58) Field of Search ............... 114/67 A, 67 R, 114/288, 271, 274, 289, 290

(56) References Cited

U.S. PATENT DOCUMENTS

| | | |
|---|---|---|
| 3,968,763 | 7/1976 | Mason . |
| 4,090,459 | 5/1978 | Chaplin . |
| 4,165,703 | 8/1979 | Burg . |
| 4,169,514 | 10/1979 | Wheeler et al. . |
| 4,196,686 | 4/1980 | Moran . |
| 4,506,618 | 3/1985 | Chaplin . |
| 4,543,901 | 10/1985 | Stringer . |
| 4,587,918 | 5/1986 | Burg . |
| 4,708,077 | 11/1987 | Balquet et al. . |
| 4,714,041 | 12/1987 | Jaffre et al. . |
| 4,836,121 | 6/1989 | Kordon . |
| 4,862,817 * | 9/1989 | Hornsby, Jr. et al. ............... 114/288 |
| 5,176,095 | 1/1993 | Burg . |
| 5,273,127 | 12/1993 | Burg . |
| 5,415,120 | 5/1995 | Burg . |
| 5,454,440 | 10/1995 | Peters . |
| 5,570,650 | 11/1996 | Harley . |
| 5,611,294 | 3/1997 | Burg . |
| 5,746,146 | 5/1998 | Bixel . |
| 5,860,380 | 1/1999 | Burg . |
| 5,950,559 | 9/1999 | Klem . |

\* cited by examiner

*Primary Examiner*—Stephen Avila
(74) *Attorney, Agent, or Firm*—Luedeka, Neely & Graham, PC

(57) ABSTRACT

A deep-V hull configuration for a surface effect ship (SES) that utilizes a cushion of pressurized air and improves the handling characteristics and efficiency of the vessel is provided by the present invention. The surface effect vessel has an air cushion recess for containing the pressurized cushion of air that has a sloped transition area on a bow side edge. Water redirecting structures on the deep-V hull direct a turbulent water flow toward blow through areas of the air cushion recess and, thus, prevent air from escaping from the air cushion recess. Multiple longitudinal and transverse air compartments are formed in the air cushion recess. Specialized separation portions provide for restricted air communication between the multiple air compartments. Air is introduced into the multiple air compartments at independently adjustable pressures to facilitate turning and to adjust for various operating conditions. Specialized drive shafts and prop configurations are further utilized to improve the functioning of the surface effect vessel. The present invention may be utilized for fast marine transportation as well as various military applications.

37 Claims, 15 Drawing Sheets

*Fig.* 5

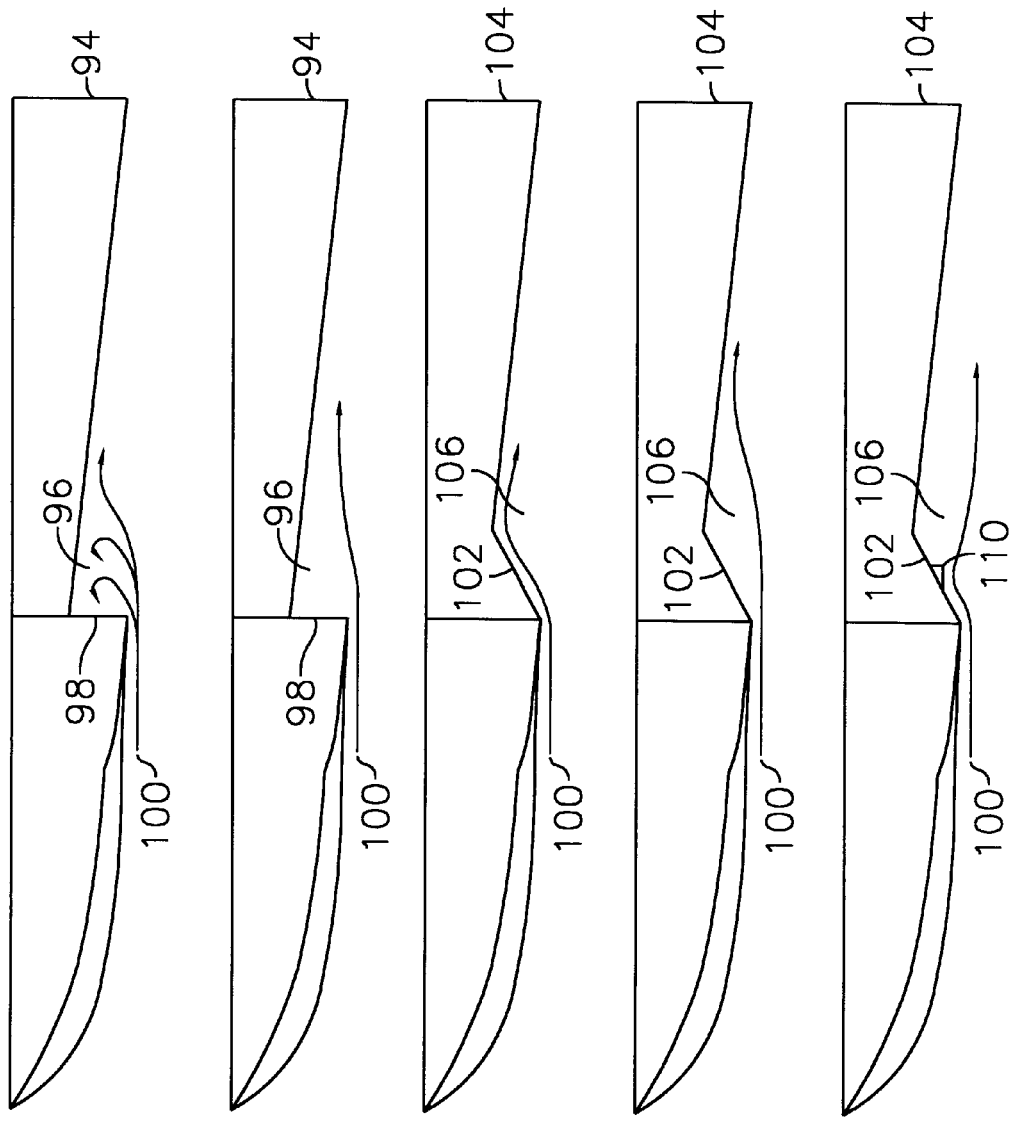

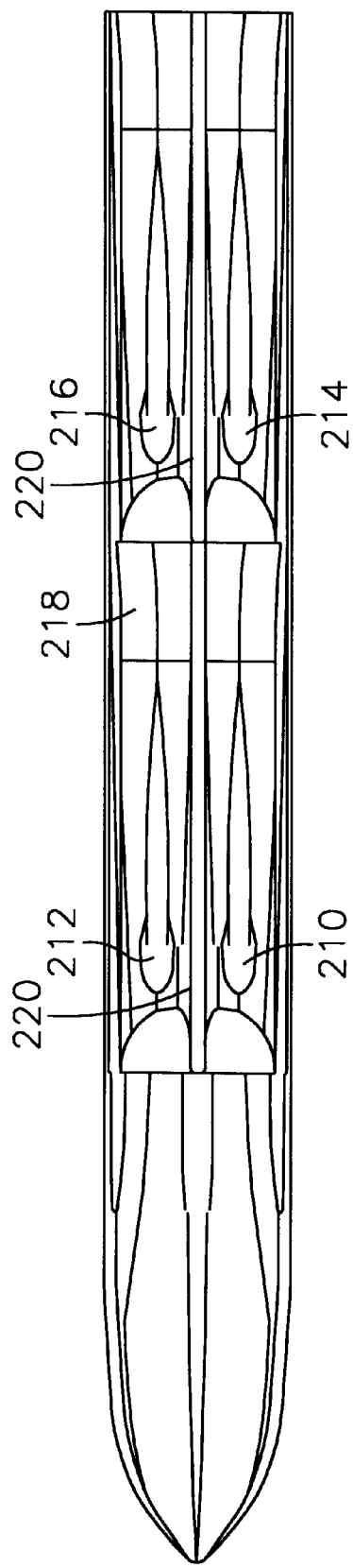

SURFACE EFFECT SHIP (SES) HULL CONFIGURATION HAVING IMPROVED HIGH SPEED PERFORMANCE AND HANDLING CHARACTERISTICS

FIELD OF THE INVENTION

The present invention relates generally to the field of surface effect vessels. More particularly, the invention relates to a hull configuration and engine/blower arrangement for a high speed surface effect vessel that utilizes cushions of air to reduce friction between the boat hull and water surface.

BACKGROUND OF THE INVENTION

Surface effect vessels which use cushions of air to reduce friction between the boat hull and the water are well known in the prior art. Basically, surface effect vessel technology involves injecting pressurized air under the hull of a boat so that at least a portion of the boat hull rides upon a cushion of air. By utilizing gas pressure contained within a pocket under the hull, a surface effect vessel can operate at higher speeds and reduced power levels as compared to conventional vessels. This increased performance is due to the fact that the friction between the air cushion and the boat hull is substantially less than the friction between the water and the boat hull. Thus, riding upon a cushion of air allows a surface effect vessel to reach higher speeds and operate more efficiently with a smaller engine than a typical vessel.

There are many prior art designs which utilize this surface effect. For examples, see U.S. Pat. Nos. 5,860,380, 5,611,294, 5,415,120 and 5,176,095 to Burg, U.S. Pat. No. 5,570,650 to Harley, U.S. Pat. No. 4,574,724 to Stolper and U.S. Pat. No. 3,968,763 to Mason, the disclosures of which are hereby incorporated by reference. One of the primary problems with these and all other prior art designs is that the water/air seal that is maintained by the displacement of the hull allows excessive amounts of air to escape. This air loss increases the volume and pressure of the air required to maintain an air cushion under the vessel. Producing and providing pressurized air requires power from the vessel's engines and blowers. Thus, the efficiency and performance of the vessel are greatly diminished when air escapes from the supporting air cushion.

Prior art surface effect vessels, such as those discussed above, further suffer from a number of other additional problems. For example, prior art surface effect vessels have a greater tendency to loose their supporting cushion of air in choppy or rough seas. As the surface effect vessel rolls in the rough seas, air in the supporting cushion tends to escape from the sides of the boat hull. In addition, air tends to escape from the supporting air cushion when the aft and bow portions of the surface effect vessel are lifted out of the water as the vessel rides over wave peaks. When air from the air cushion is lost, a larger portion of the vessel's hull comes into contact with the water's surface. This air loss results in dramatically increased friction between the vessel and the water and causes the vessel to slow down or lurch. Thus, maintaining the low friction air cushion beneath a vessel's hull under adverse conditions is an important aspect of the design of surface effect vessels.

One prior art approach to maintaining the air cushion utilizes a flexible skirt positioned around the edges of the boat hull to help contain the air cushion. An example of such an embodiment is a hovercraft. Unfortunately, the flexible skirts used in these types of applications increase the resistance of the vessel through contact with the water's surface. In addition, these flexible skirts require extensive and expensive maintenance. Furthermore, these skirts are still prone to allow more air to escape from the air cushion in rough seas.

Yet another problem with prior art surface effect vessels is that their hulls are substantially planar in the area in front of the air cavity. The hull is constructed to be planar in the region in front of the air cavity to allow the air cushion to extend as far as possible to the sides of the vessel. However, at high speeds or in rough seas, this planar hull section will tend to ride up on wave peaks. The bouncing of the vessel results in a rough bumpy ride and decreased stability. In addition, as the planar hull section rises and falls in the heavy seas, air tends to vent from the supporting air cushion. Therefore, what is needed is a surface effect vessel that is configured to operate in heavy seas.

V-shaped hulls are designed to provide an improved ride in rough water, as compared to relatively flat hulls, by deflecting wave energy away from and to the sides of the hull. Thus, traditional V-shaped hulls provide improved ride qualities at the expense of low speed planing and fuel efficiency. However, if the hull of a surface effect ship is made a moderate to deep V-shape, air from the air cushion tends to vent from the sides of the V-shaped hull when the vessel's speed increases and the edges of the V-shaped hull rise out of the water. Thus, prior art surface effect vessels have not utilized deep-V hulls. Therefore, what is needed is a deep-V hull configuration for a surface effect vessel that provides improved high speed handling characteristics without substantially increasing the amount of air venting from the air cushion.

SUMMARY OF THE INVENTION

The present invention is designed to address the above discussed problems with the prior art by providing an improved surface effect boat hull configuration and layout that minimizes the friction between the boat's hull and the water while providing an improved degree of stability in rough seas. In particular, one embodiment of the present invention is directed toward a vessel for moving across the water's surface wherein the vessel has a V-shaped hull for supporting the vessel upon the water's surface. The V-shaped hull has a gas cavity. The gas cavity is preferably concave with respect to the water's surface and is adapted to receive pressurized gas from a gas blower. The V-shaped hull further includes air restricting side hull portions adapted to reduce gas loss from the gas cavity. The air restricting side hull portions extend substantially parallel to the vessel's direction of movement along the V-shaped hull. The V-shaped hull also has water redirecting projections positioned near a leading edge of the air restricting side hull portions. The water redirecting portions are adapted to direct a flow of water toward a blow through area of the V-shaped hull such that a portion of the pressurized gas is prevented from venting from the air cavity through the blow through area. While not preferred, it is appreciated that, for specialized applications, the water redirecting portions may be manually or automatically controllable such that the turbulent water flow can be adjustably directed toward one of a multitude of blow through area locations.

The provision of water redirecting portions improves upon the prior art by allowing the vessel to travel at a higher rate of speed without venting air from the supporting air cushions. In addition, the water redirecting portions allow a surface effect vessel to be constructed with a more steeply sloped V-shaped hull having a higher dead rise angle. As discussed in more detail below, a steeply sloped V-shaped hull improves the handling and ride quality of a surface effect vessel in rough seas by allowing the hull of the vessel to pierce through the wave peaks.

The present invention further comprehends another embodiment wherein a pair of blow through areas are located on opposite sides of the V-shaped hull adjacent to the leading edges of the air restricting side hull portions and the pair of blow through areas are lifted above the water's surface when the vessel reaches a critical blow through speed. In this embodiment, the water redirecting portions are curved extensions of the air restricting side hull portions that create a turbulent high velocity water flow directed toward the blow through areas. Cornering chines extend from the sides of the hull and increase the stability of the vessel in hard turns. A dividing portion is positioned in the gas cavity such that the gas cavity is divided into at least two longitudinal portions with respect to the vessel's direction of motion such that a release of pressurized gas from one of the two longitudinal portions will not necessarily cause a release of pressurized gas from the other longitudinal portion. The vessel further includes a second V-shaped hull having a gas cavity that is concave with respect to the water's surface such that the air cavity is adapted to receive pressurized gas from a gas blower. The second V-shaped hull also has air restricting side hull portions adapted to reduce gas loss from the gas cavity. These air restricting side hull portions extend substantially parallel to the vessel's direction of movement along the second V-shaped hull. Water redirecting projections are positioned near a leading edge of the air restricting side hull portions. The water redirecting projections are adapted to direct a flow of water toward a blow through area of the second V-shaped hull such that a portion of the pressurized gas is prevented from venting from the air cavity. The gas cavity has a leading edge region on a bow side of the gas cavity that is sloped with respect to the water's surface. A deck portion secures the V-shaped hull to the second V-shaped hull such that the vessel has a catamaran type configuration. A first gas pressure in the gas cavity in the V-shaped hull and a second gas pressure in the gas cavity in the second V-shaped hull are independently adjustable. A first blower is located in the V-shaped hull and a second blower is located in the second V-shaped hull.

In an alternative embodiment, the gas cavity is also divided into an aft compartment and a bow compartment. The aft compartment and the bow compartment are separated by a separation portion. The aft compartment has a first inlet port for introducing pressurized gas from a blower into the aft compartment and the bow compartment has a second inlet port for introducing pressurized gas from a blower into the bow compartment. A first gas pressure in the aft compartment is controlled independently of a second gas pressure in the bow compartment. The separation portion is preferably positioned above the running water height. Thus, a restriction area is formed such that the aft compartment is placed in restricted gas flow communication with the bow compartment. This restriction area is formed between a lower surface of the separation portion and the water's surface when the vessel's speed surpasses a separation speed. The aft edge of the separation portion may be movable with respect to the bow and stem directions as well as up and down with respect to the water's surface. The gas pressure in the restriction area is higher than the gas pressure in the aft compartment and the bow compartment.

In yet another embodiment, a vessel has a surface drive shaft with a high speed prop wherein the surface drive shaft is coupled to a multi speed transmission. Gas introduction means introduce gas in an area near the prop and, thus, reduce the start up resistance of the prop by reducing the working area of the blades of the prop. The air restricting side hull portions have restricted air release means adapted to provide a lubricating air flow along an outer edge of the air restricting side hull portions such that friction between the outer edge of the air restricting side hull portions and the water's surface is reduced. A blower is placed in gas communication with a gas cavity through an air inlet port. The air inlet port is positioned in the gas cavity such that the pressurized gas is introduced into the gas cavity with a motion substantially parallel to the water's surface. Preferably, the vessel has a V-shaped hull with a dead rise angle greater than 26 degrees.

Another embodiment of the present invention is directed toward a deep V-hull configuration for a surface effect ship that utilizes a cushion of pressurized air to reduce frictional forces acting between the water's surface and the deep V-hull configuration. The deep V-hull configuration includes a longitudinal hull body having an air cushion recess for containing a cushion of pressurized gas between a portion of the longitudinal hull body and the water's surface. A transition area is provided between a bow side edge of the air cushion recess and the longitudinal hull body. The transition area runs substantially perpendicular to the longitudinal hull body and the hull body in the transition area slopes upward from the waters surface at an angle less than 70 degrees. A surface drive shaft coupled to a multi speed transmission is mounted toward an aft end of the longitudinal hull body. A critical angle separation protrusion runs perpendicular to the longitudinal hull body. The critical angle separation protrusion facilitates separation of the water's surface from the longitudinal hull body in the transition area at the critical angle separation protrusion when the surface effect ship's speed surpasses a desired planing speed. A port water redirecting portion and a starboard water redirecting portion are provided. The port and starboard water redirecting portions are located on the longitudinal hull body. When the surface effect vessel reaches a predetermined speed at which the deep-V hull configuration has lifted the longitudinal hull body with respect to the water's surface, a port side edge and a starboard side edge of the air cushion recess are lifted from the water's surface. At this point, the port water redirecting portion directs a turbulent water flow toward the port side edge of the air cushion recess and the starboard water redirecting portion directs a turbulent water flow toward the starboard side edge of the air cushion recess. These turbulent water flows prevent air from venting from the edges of the air cushion recess. A second longitudinal hull body constructed similar to the first longitudinal hull body may be connected to the longitudinal hull body by a deck portion to form a catamaran type structure.

In yet another embodiment of the present invention, the air cushion recess is divided into a bow and aft portion by a dividing portion having a bottom surface. The bottom surface of the dividing portion is disposed with respect to the water's surface such that at a predetermined speed the bottom surface separates from the water's surface to create a restricted gas/air flow channel between the bow and aft portion of the air cushion recess. The dividing portion is constructed such that if air vents from the aft portion of the air recess, the bottom surface of the dividing portion will come into contact with the water's surface and substantially prevent air from venting from the bow portion of the air recess. Similarly, if air vents from the bow portion of the air recess, the bottom surface of the dividing portion will come into contact with the water's surface and substantially prevent air from venting from the aft portion of the air recess.

Air cushion recess sealing means minimize venting of pressurized gas from the air cushion recess. The air cushion sealing means allow a restricted amount of pressurized gas to vent from a port side edge and starboard side edge of the air cushion such that a lubricating airflow is created on the edges of the air cushion recess.

The present invention further includes an embodiment directed toward a vessel with a V-shaped hull for supporting the vessel upon the water's surface. The V-shaped hull has a gas cavity that is concave with respect to the water's surface and adapted to receive pressurized gas from a gas blower. The V-shaped hull further includes air restricting side hull portions adapted to reduce gas loss from the gas cavity. The air restricting side hull portions extend substantially parallel to the vessel's direction of movement along the gas cavity. The air restricting side hull portions have limited air ejection means for producing a lubricating air flow between an outer edge of the air restricting side hull portions and the water's surface. The gas cavity has a leading edge region on a bow side of the gas cavity that is sloped with respect to the water's surface.

Yet another embodiment of the present invention is directed toward a catamaran boat having at least two hulls. The hulls include a bow portion having a deep V-configuration with a dead rise angle greater than 26 degrees. The hulls also have an aft portion wherein is defined an air cushion recess having a port side edge and a starboard side edge. The air cushion recess is bounded by sealing sidewalls. Water redirecting means redirect a turbulent water flow toward the port side edge and the starboard side edge of the air cushion recess. A leading edge region on a bow side of the air cushion recess is sloped with respect to the water's surface when the catamaran boat is supported by water. An aft region of the at least two hulls contains a hook angle projection. In an especially preferred embodiment the hook angle projection is adjustable.

Having summarized various aspects of the invention, the invention will now be described in greater detail with reference to the following figures wherein similar reference numerals designate the similar features throughout the figures.

BRIEF DESCRIPTION OF THE DRAWINGS

FIGS. 7(a–e) illustrate the benefits of a sloped transition region and a critical speed protrusion;

FIG. 15 is a bottom view of an embodiment having longitudinally divided bow and aft air compartments.

DETAILED DESCRIPTION OF THE INVENTION

As briefly discussed above, preferred embodiments of the present invention are directed toward surface effect boat hulls having an air cavity that is in communication with a blower. The blower introduces pressurized air into the air cavity such that a portion of the boat's weight is supported by the air cushion. The air filled cavity preferably has a front portion which slopes upwardly from the water's surface in a forward section and slopes downwardly toward the water's surface in an aft portion. Side hulls, which are substantially perpendicular to the water's surface and run along the sides of the air cavity, help minimize the amount of air escaping from the sides of the cavity. In addition, the side hulls provide added stability through an outrigger like effect. This outrigger effect is particularly beneficial in mono hulled vessels. By utilizing gas pressure contained within a pocket or cavity, the surface effect vessel can operate at a higher speed or reduced power level as compared to conventionally hulled vessels.

Figure 1:
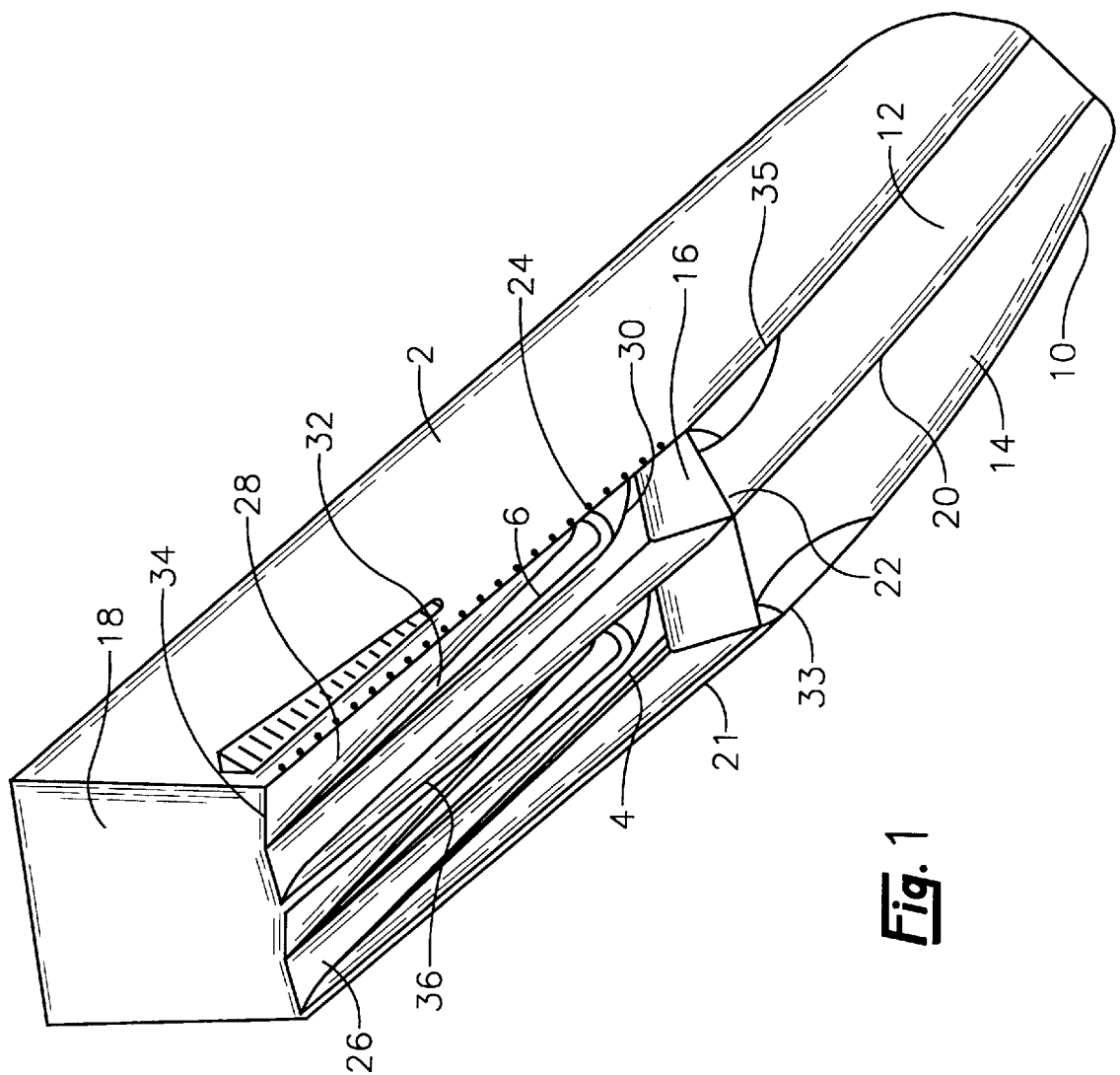
FIG. 1 is a three dimensional view of the bottom of a hull having dual longitudinal air cavities in accordance with the present invention.

Turning now to FIG. 1, a three dimensional view of the bottom of a boat hull 2 having dual longitudinal air cavities 4 and 6 and a variety of other attributes of the present invention is shown. The longitudinal starboard side air cavity 6 and the longitudinal port side cavity 4 are located aft of the bow 10 of the hull 2. The hull 2 is preferably a deep V-hull having relatively highly sloped front side sections 12 and 14 that rise up from the vertex 20 of the V-shaped hull 2 as previously discussed. The slope of front side sections 12 and 14 of the hull 2 decreases gradually from the bow 2 to a transition region 16. On the bow side edge of the transition region 16, the bottom of the hull 2 slopes upward from a leading edge 22 to form a bow side area of the starboard 6 and port 4 air cavities. While the transition region 16 is shown in FIG. 1 as being positioned near the center of the boat hull 2, it is appreciated that the location of the transition region 16 may be varied further toward the aft or bow of the vessel to accommodate a variety of factors such as the weight distribution of the particular vessel on which the present invention is being utilized.

A preferred way to minimize the effects of side venting in accordance with the present invention is to longitudinally divide the air compartments of a surface effect vessel. Longitudinally dividing the air compartments, such as shown in FIG. 1, minimizes the effect of side venting by only allowing air from one of the longitudinal compartments to vent under a variety of conditions. Thus, a portion of the air cushion under the hull remains intact and the increase in the drag of the hull of the vessel in the water is minimized. Thus, lurching and slowing of the vessel due to the venting of air from the supporting air cushion are correspondingly minimized.

One condition under which side venting is likely to occur is during hard turns. As the surface effect vessel turns, the outer edges of the hull may rise in the water. If the amount of rise is sufficient, the bottom edges of the side hulls will rise out of the water and the air cushion will vent causing the cushion to lose pressure and volume. This venting results in the adverse affects upon the surface effect vessel's performance that were previously discussed. Longitudinally establishing multiple air chambers reduces the adverse effects of side venting by limiting the extent to which the air cushion collapses. For example, during a hard turn only the outermost longitudinal air chamber will vent, leaving the air cushion in the remaining inner longitudinal air chamber intact. Thus, the provision of longitudinally divided air chambers minimizes the undesirable effects of side venting.

Preferably, air vents and blowers are arranged such that the air pressure in the multiple longitudinal air chambers 4 and 6 is independently adjustable. Providing multiple longitudinal air chambers 4 and 6 having independently adjustable air pressures allows an operator of the vessel to compensate for any tendency for the vessel to lean to one side or the other due to any one of a variety of conditions such as turning or imbalanced loading. If the vessel is leaning to the port side, the pressure on the port side can be increased relative to the pressure on the starboard side. This will cause the port side to rise in the water. Thus, the provision of multiple longitudinal air chambers with independently adjustable air pressures allows tilting of the vessel to be compensated for and overcome. Furthermore, as discussed in more detail below, the amount of air pressure in the longitudinal air chambers can be automatically controlled by a gyroscope type leveling system that uses the horizon as a reference. Automating the leveling process reduces the demands made upon an operator of the vessel.

The ability to independently adjust the air pressure in the longitudinal air chambers 4 and 6 may also be utilized to steer the surface effect vessel. For example, when a surface effect vessel such as that shown in FIG. 1 is moving at a high rate of speed, decreasing the air pressure in the starboard air chamber 6 will cause the starboard side to drop lower in the water increasing the drag on the starboard side of the vessel. This increase in drag will cause the vessel to turn in the starboard direction. The independently adjustable pressures can further be utilized with traditional steering methods to increase the safety and comfort of the vessel when making of turns. Thus, the provision of dual longitudinal air chambers having independently adjustable air chambers in a surface effect vessel provides significant advantages over the prior art by improving the stability and handling characteristics of the vessel.

The present invention also comprehends an embodiment wherein the air cushion region of the surface effect vessel's hull is longitudinally divided into a plurality of air chambers by multiple dividing portions similar to the dividing portion 36 in FIG. 1 that runs longitudinally along the underside of the boat hull. As discussed above, dividing the air cushion longitudinally provides a number of benefits. In addition, another benefit of multiple longitudinal air cavities may be observed in the performance of a surface effect vessel in choppy or rough seas. In rough seas, the surface effect vessel may tend to roll from one side to the other. If the degree of roll is sufficient, the side hulls may temporarily be raised out of the water and thereby allow air from the supporting air cushion to vent. When the air vents, the air cushion is temporarily lost and the boat hull falls into contact with the water. As previously discussed, this results in an increased amount of drag and a corresponding decrease in the vessel's performance. However, the provision of multiple longitudinal air chambers minimizes the amount of air that escapes from the air cushion by limiting the venting to the exposed longitudinal air chamber.

One way in which to prevent air from escaping under the above discussed conditions is to increase the depth to which the side hulls 21 and 24 extend into the water. However, increasing the depth of the side hulls 21 and 24 results in an increased amount of drag and thereby decreases the operating efficiency of the vessel. In addition, as their size increases, the side hulls 21 and 24 begin to function more and more as keels which may hamper the maneuverability and shallow water performance of the surface effect vessel.

As previously discussed, the preferred hull of a boat in accordance with the present invention is generally V-shaped and slopes upwardly from the water's surface near the bow. Near the bow 10 the sides of the V-shaped hull are steeply sloped with respect to the water's surface. However, the V-shape of the hull widens to a greater extent toward the aft of the hull. The angle between the legs of the V and an imaginary plane parallel to the water's surface that passes through the apex of the V shrinks from the bow 10 to the beginning 22 of the air cavity region. Preferably, this angle, which we will be referred to as the dead rise angle, is greater than approximately 26 degrees at the intersection of the V-shaped hull and the bow side edge of the air cavity region. Experience has shown that a boat having a V-shaped hull with a dead rise of greater than about 26 degrees in this region provides optimal performance by slicing through the waves and deflecting wave energy away from the boat instead of riding over the wave peaks and exposing the edges of the supporting air cushion.

Figure 2A:
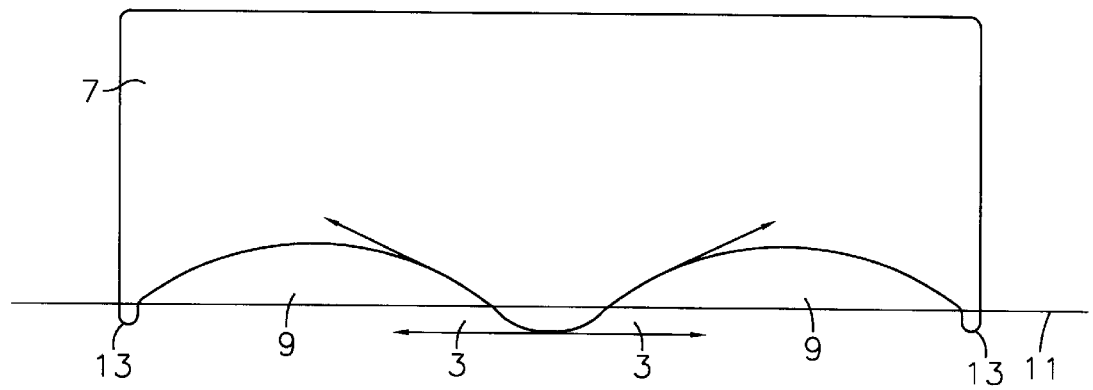
FIGS. 2(a) and (b) illustrate two cross sectional views of hulls having different dead rise angles.
Figure 2B:
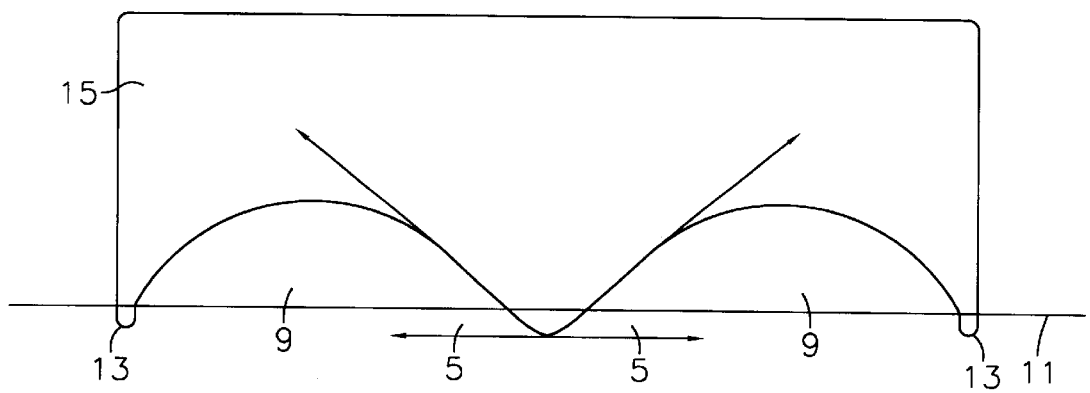

FIG. 2(a) shows a front view of the bow of a boat having a relatively low dead rise angle 3 of approximately 20 degrees while FIG. 2(b) shows a front view of the bow of a boat having a relatively high dead rise angle 5 of approximately 30 degrees. The V-shape of the hulls 7 and 15 shown in FIGS. 2(a) and (b) creates blow through areas 9 between the hulls 7 and 15, the water's surface 11, and the sealing side hulls 13 when the hulls 7 and 15 rise in the water due to an increase in speed. As can be seen in FIGS. 2(b), the hull 15 having the deeper dead rise angle 5 creates larger blow through areas 9 at a given speed than the hull 7 having a shallower dead rise angle. The preferred embodiment of the present invention has a bow with a dead rise angle greater than 26 degrees. However, it will be readily appreciated that the present invention will also provide benefits when used with a wide variety of dead rise angles.

Vessels having a deep V-shaped hull with a dead rise greater than about 26 degrees provide improved ride qualities at the expense of low speed planing and fuel efficiency. In particular, a deep V hull configuration improves high speed handling by using the bow of the hull to cut through or pierce waves and the sides of the hull to deflect the wave energy away from the vessel. Wave piercing projections may be provided on the bow to further facilitate the piercing effect of the deep V hull configuration. However, as discussed above, the relatively deep V-shaped hull 15 creates larger blow through areas 9 than the relatively shallow V-shaped hull 7.

Referring back to FIG. 1, the slope of the front side sections 12 and 14 with respect to the plane of the water upon which the hull 2 will be traveling near the leading edge 22 of the air cavities 4 and 6 may be referred to as the dead rise angle of the hull 2 as previously discussed. A hull in accordance with a preferred embodiment of the present invention has a dead rise angle greater than 26 degrees. A large dead rise angle is desirable because it improves the high speed performance of the hull 2. As the speed of the hull 2 across a liquid's surface increases, the force of the liquid acts upon the front side sections 12 and 14 of the hull and causes the hull 2 to rise up with respect to the liquids surface. Thus, a decreased portion of the hull 2 rest upon the liquid's surface at high speeds. This reduces the high speed effects of friction upon the hull 2.

In addition to reducing the high speed effects of friction upon the hull 2, the deep v-shape of the hull 2, deflects wave energy to the sides of the hull 2 when the hull is operating in waves. By deflecting the wave energy to the sides, the relatively highly sloped front side sections 12 and 14 allow the hull to slice through waves instead of jumping over the waves. This deflecting effect is especially important for improved ride characteristics when the hull 2 is traveling across the water at high speeds. Thus, the deep V-shaped hull 2 provides a number advantages during high speed operation of the hull.

As previously discussed, side hull projections 21 and 24 are placed longitudinally along the sides of the air compartments in the vessel's hull. These side hulls extend a distance down in the water to form a seal which helps prevent gas from the air cushion from escaping from underneath the vessel. However, in conventional surface effect ships, substantial quantities of air will escape from the sides of the V-shaped hull when the boat speed increases and the boat hull rises out of the water and exposes the edges of the frontal portions of the air compartment. This effect is due to the fact that as the boat rises out of the water, the leading edges, or forward seal, of the side hulls 21 and 24 that contain the air cushion correspondingly rise with respect to the water. Thus, as discussed in more detail below, a blow through area is created on each side of the V-shaped hull between the legs of the V and the leading edge of the side hulls 21 and 24. This excessive blow through problem is especially exaggerated in a large ship such as a ferry.

For example, a moderately sloped V-shaped hull with a dead rise angle of 15 degrees and a beam of 20 ft will present a blow through area that is a maximum of 2.7 ft high on each side of the V and a deep v-hull having a dead rise angle of 26 degrees and a beam of 20 ft will present a blow through area that is a maximum of 4.9 ft high.

The above discussed embodiment of the present invention controls and directs the water flow and pressure at the forward water/air boundary of the hull 2 such that a V-hulled bottom can be efficiently used with moderate to deep dead rise angles. By controlling the water flow at the forward air/water boundary, the present invention provides an improved rough water ride and improved control of the pressurized gas cushions as compared to prior art surface effect vessels.

In order to minimize and substantially alleviate the above discussed blow through areas and corresponding air venting problems, the present invention utilizes shaped side hull sections 33 and 35 to channel water toward the blow through holes. The shaped side hull sections 33 and 35 are preferably placed on the leading edges of the side hulls 21 and 24 and have a shape which channels water toward the blow through areas. Thus, as the boat speed increases, water deflected by the side hull sections 33 and 35 forms a water plug in the blow through areas which prevents air from the cushion from venting and causing the air cushion to collapse. While the shaped side hull projections are discussed with respect to multi hulled vessels and vessels having multiple air cushions or compartments, it is explicitly recognized that they can be used just as effectively with a mono hulled vessel having a single air cushion. Furthermore, while the shaped side hull projections are discussed with regard to a deep-V hull configuration, it is also readily appreciated that the side hull projections are useful for minimizing the effects of blow through areas created by any other hull configuration such as a shallow V.

Thus, an opportunity for air to escape from the air compartment of a surface effect vessel arises from the V-shape of the hull. As boat speed increases, the sides of a V-shaped hull rise out of the water causing the footprint of the boat hull in the water to narrow. When the footprint narrows to the point that the edges of the side hulls and, thus, the edges of the air compartments are lifted out of the water, blow through areas are created on the sides of the air compartment. Thus, the air escapes from the air compartment and the air cushion begins to collapse. As discussed above, this results in a rapid increase in the size of the foot print of the boat hull in the water. Correspondingly, an increased amount of drag is experienced by the surface effect vessel. This increase in drag may cause the vessel to experience rapid changes in speed. In addition, the loss of pressure in an air compartment of a multi hulled vessel may cause the vessel to rock from one side to the other, thereby increasing the difficulty of steering the vessel while decreasing the comfort of the vessel.

The present invention compensates for the above discussed edge effects by placing a pair water directing projections on the boat hull surface. The water directing projections 33 and 35 are preferably placed slightly forward of the leading edge of an air compartment on the side hulls that contain the air cushion under the boat hull as shown in FIG. 1. The water directing projections 33 and 35 produce a high velocity stream of water that is directed toward the blow through areas on the side portions of the air compartment. This turbulent high velocity water flow from the water directing projections 33 and 35 creates water plugs in the blow through areas. These water plugs substantially oppose the pressurized air attempting to vent through the blow through areas and, thus, prevent excessive venting. Thus, the side hull water directing projections 33 and 35 decrease the extent to which air can escape through the blow through areas and vent from the supporting air cushion.

If a deep V-shaped hull without side hulls having the water directing portions 33 and 35 is used for a vessel, the vessel will have a lower than normal terminal speed. As surface effect vessels are typically designed to be high speed vessels, a decrease in their top speed is often considered a significant drawback. The shaped side hulls also provide an increased amount of hydrodynamic lift to the hull at low speeds by directing water in an upward fashion into the hull as will be discussed in more detail below. In addition, when used in conjunction with a mono hulled surface effect ship, the side hulls stabilize the vessel by minimizing side to side rocking of the hull.

The side hulls and forward keel areas discussed above are preferably built strong enough to withstand major wave impacts. In addition, the side hulls 22 and 24 are preferably strong enough to act as frontal guards or surfaces that can withstand occasional impacts with sand bars, floating objects and/or mud bottoms. When a collision occurs, the side hulls function to carve into the mud or sand before the rest of the hull and cushion the impact. Thus, the side hulls can also be used to minimize damage during a low speed grounding of a surface effect vessel.

Applicant has further discovered that by sloping the transition region 16 on a hull such as that shown in FIG. 1, low speed resistance can be minimized without substantially compromising the top speed of a vessel for a given power input. The transition region 16 preferably slopes upward from the water's surface at an angle less than 80 degrees when the hull 2 is resting in the water. More preferably this angle is less than 60 degrees. However, it is appreciated that the optimum value of this angle will vary to a degree based upon the speed, weight distribution and particular construction of the hull 2. It should also be noted that the transition area 16 can be shaped in a curved fashion so that different portions of the transition area 16 have different slopes. However, in the preferred embodiment, the transition area 16 is not substantially perpendicular to the water's surface. Conventional surface effect boat designs fail to teach constructing the leading edge of an air cavity such that it slopes upward from the bottom of the hull. An unsloped transition area causes the water's surface to break cleanly from the hull 2 at high speeds. However, as discussed in more detail below, an unsloped transition area also causes drag and low speed maneuverability problems in surface effect vessels.

As previously discussed with respect to FIG. 1, a hull 2 in accordance with the present invention has side hulls 21 and 24 that help minimize the amount of gas escaping from the gas cavities 4 and 6. The edges of the side hulls 21 and 24 extend into the water's surface to establish a seal that prevents a portion of the gas contained in the cavities 4 and 6 from escaping. The gas contained in the cavity reduces the amount of surface area on the hull 2 that is in contact with the water's surface. Since the frictional effects of water are greater than those of air, the drag of the hull is decreased and the speed of the hull across the water's surface is increased for any given amount of thrust. Thus, a vessel having a well maintained gas cushion has a higher top speed, smoother ride and is more fuel efficient than a conventional surface effect ship.

The aft edges of the air cavities 4 and 6 slope downward from a higher bow area 30 to a lower aft area 32. The aft most edge 34 of each of the air cavities 4 and 6 preferably forms a relatively shallow single or multiple inverted V-shape. The force of water coming into contact with aft most edge 34 establishes an aft seal that inhibits air from escaping from the air cavities 4 and 6. While experience has shown the shallow inverted V-configuration to be preferable, it is appreciated that other transom configurations such as a straight aft most edge 34 are also satisfactory.

Figure 3:
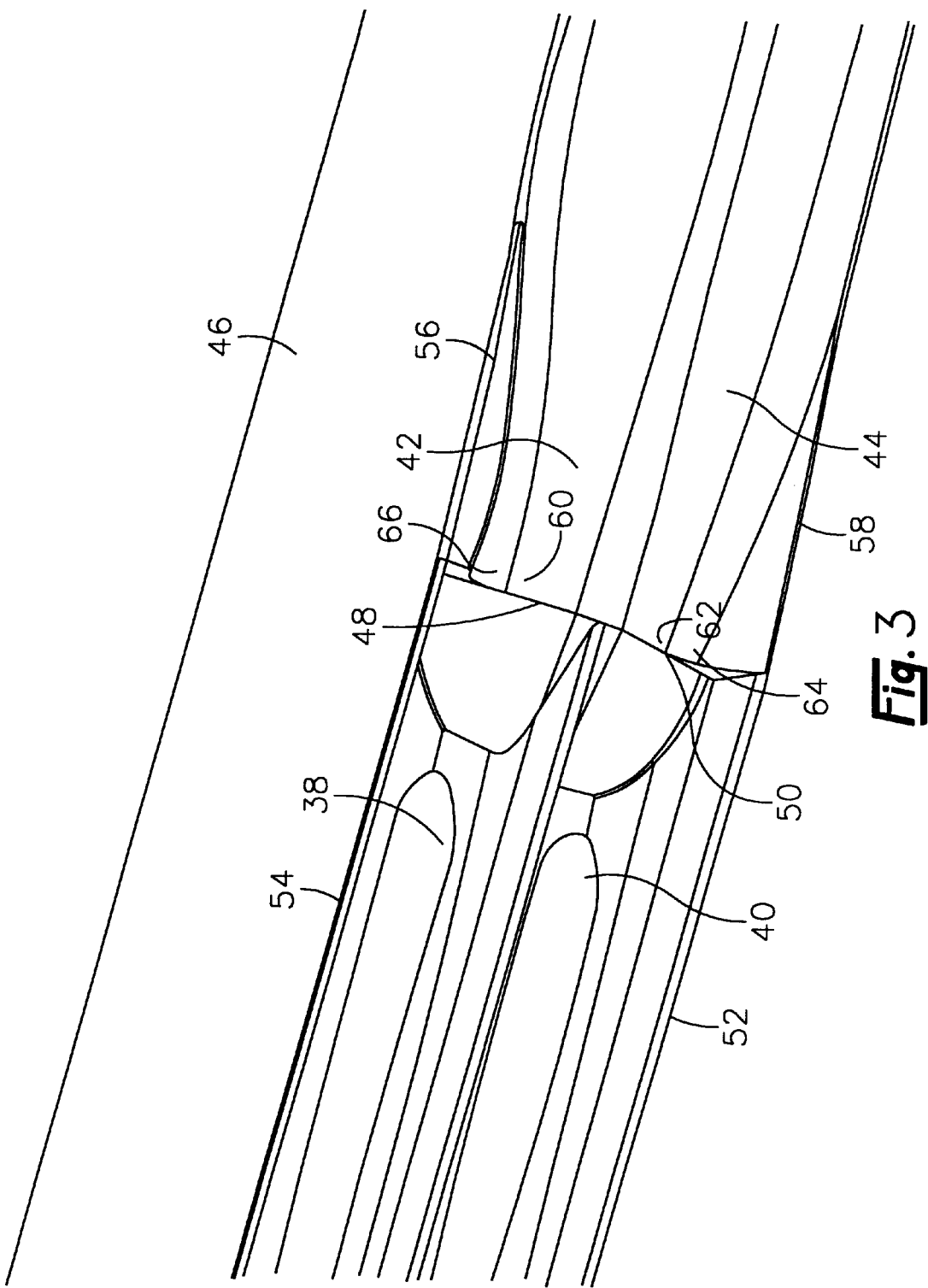
FIG. 3 is a close up three dimensional view showing a preferred embodiment of a pair of water redirecting portions positioned on the leading edge of a side hull.

Another important aspect of an embodiment of the present invention is illustrated in FIG. 3. In FIG. 3, a hull construction 46 of the present invention is depicted having two longitudinal gas cavities 38 and 40. The hull is V-shaped with sloped bow sections 42 and 44 which slope generally upward from the water's surface. The aft portions of the sloped bow sections 42 and 44 form a port side 50 and a starboard side 48 leading edge of the gas cavities 38 and 40. The port and starboard side leading edges 50 and 48 substantially follow the contour of the hull construction 46. Thus, the leading edges 48 and 50 form a V-shape having a dead rise angle of approximately 15 degrees with respect to the plane of the water's surface.

Side hull seals 52 and 54 run parallel to the gas cavities 38 and 40. The side hulls seals increase the amount the hull 46 can rise in the water before the edge of the gas cavities 38 and 40 lift from the water's surface thereby causing the pressurized gas in the gas cavities 38 and 40 to vent. When venting occurs a larger portion of the hull's surface area comes into contact with the water's surface. As previously mentioned, this is typically experienced as a lurching or slowing of the vessel due to increased frictional resistance. Thus, by preventing gas from escaping from the gas cavities 38 and 40, the side hull seals 52 and 54 improve the performance of the vessel, especially at higher speeds.

FIG. 3 also clearly depicts a vessel hull having water redirecting structures 56 and 58. The water redirecting structures 56 and 58 channel water towards blow through areas 60 and 62. The blow through areas 60 and 62 are created when the hull's speed through the water causes the hull to rise in relation to the water's surface to the point that portions of the front seal of the gas cavities 38 and 40 lose contact with the water surface. The water redirecting structures 56 and 58 redirect a portion of the water from an area of the hull in contact with the water's surface towards the blow through areas that are not in contact with the water's surface at high speeds. The water redirecting structures 56 and 58 thereby maintain the forward seal of the gas cushion.

While the water redirecting structures 56 and 58 shown in FIG. 3 are passive, its is readily appreciated that dynamic water directing structures such as pressurized water pipes could be used to create a water flow directed toward the blow through areas 60 and 62. The provision of dynamic water directing structures allows the area at which the water flow is directed to be automatically or manually manipulated to insure that the water flow is properly directed toward the blow through area. Such direction control can be accomplished, for example, by placing rotatable nozzles on the ends pressurized water pipes. It is appreciated that the provision of dynamic water redirecting structures will increase the cost and complexity of constructing and operating the surface effect vessel. However, since the exact location of the blow through areas 60 and 62 varies with a number of conditions such as the speed of the vessel, the additional cost incurred by the provision of dynamic water directing structures may be outweighed by their benefits in certain applications where it is important to provide optimal performance.

In the embodiment shown in FIG. 3, the water redirecting structures 56 and 58 create a water flow that is directed toward the blow through areas 60 and 62. An effective water plug is created that allows the hull 46 to rise higher above the water's surface before the gas cavities 38 and 40 vent. Thus, the top speed which the vessel can obtain without causing the air cushion to vent is increased. Prior art hulls are deficient in that they fail to compensate for blow through areas that are created when the hull moves through the water in choppy conditions.

Figure 4:
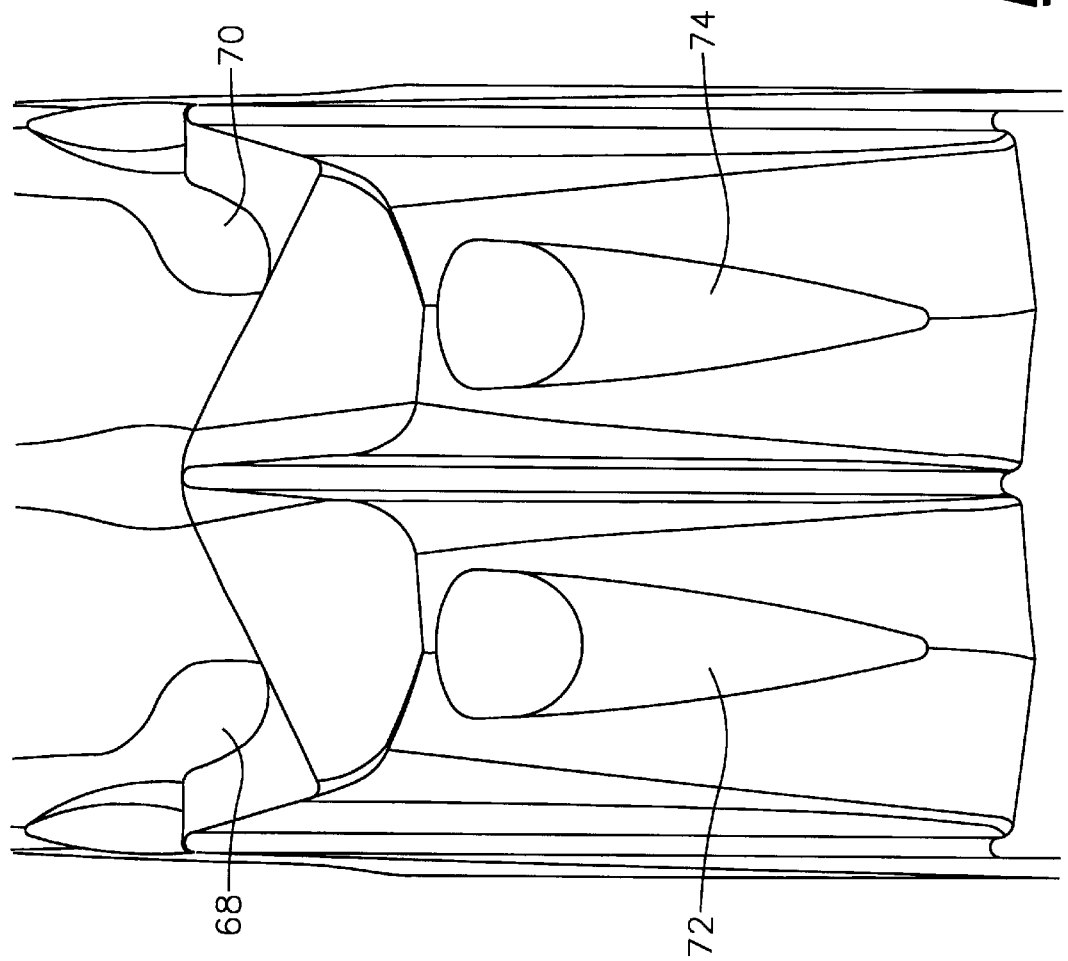
FIG. 4 is a three dimensional bottom view illustrating another embodiment of the present invention having water redirecting portions.

FIG. 4 illustrates yet another embodiment of water redirecting means. The water redirecting protrusions 68 and 70 are located on a vessel's hull forward of a pair of longitudinal air cushions 72 and 74. As can be clearly seen in FIG. 4, the water redirecting protrusions extend downward from the hull and are in front of the air cushions 72 and 74. Thus, the water redirecting protrusions 68 and 70 create directed water flows which establish or maintain water contact at predetermined locations on the vessel's hull and control the optimum ride height of the vessel.

Figure 5:
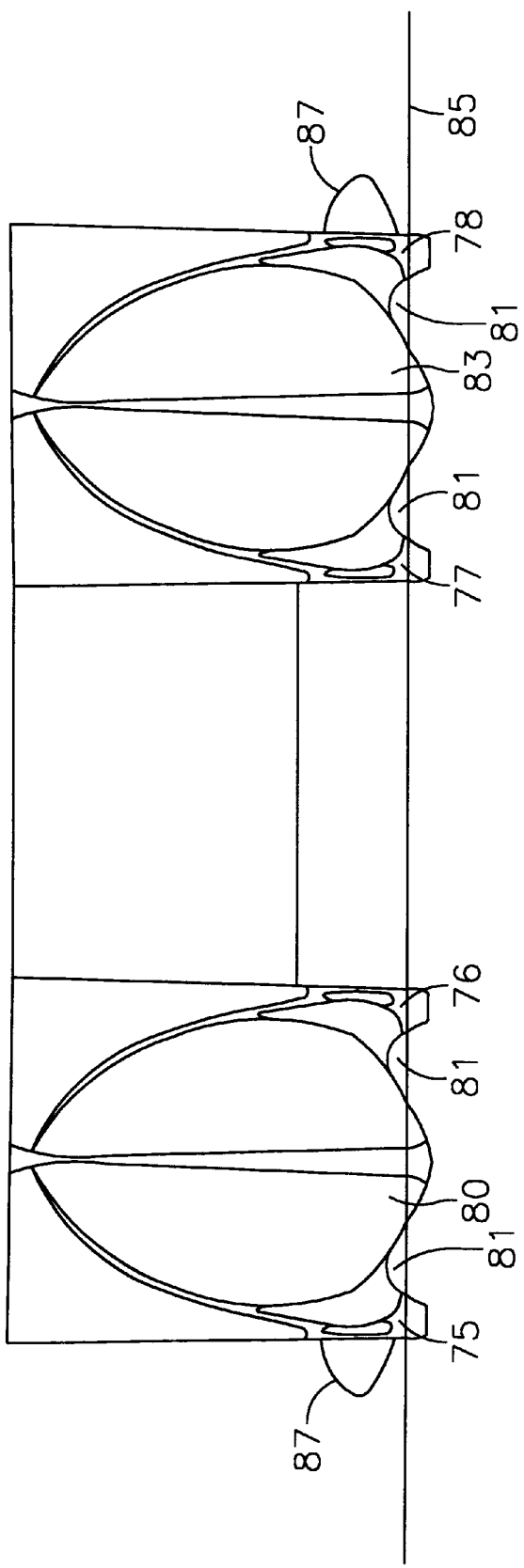
FIG. 5 is a three dimensional bow view of a catamaran having bow mounted water redirecting portions.

FIG. 5 illustrates yet another embodiment of a water redirecting hull configuration. The water redirecting means 75, 76, 77 and 78 are placed near the dual bows 80 and 83 of a catamaran-like vessel. This is because the blow through areas 81 created between the water's surface 85 and the bows 80 and 83 of a deep V-hulled large vessel will often occur relatively close to the bow. It is appreciated that the embodiment of FIG. 5 could be used to impede venting from the sides of a single gas filled recess or from the outer most edges of multiple longitudinally aligned recesses.

Figure 6:
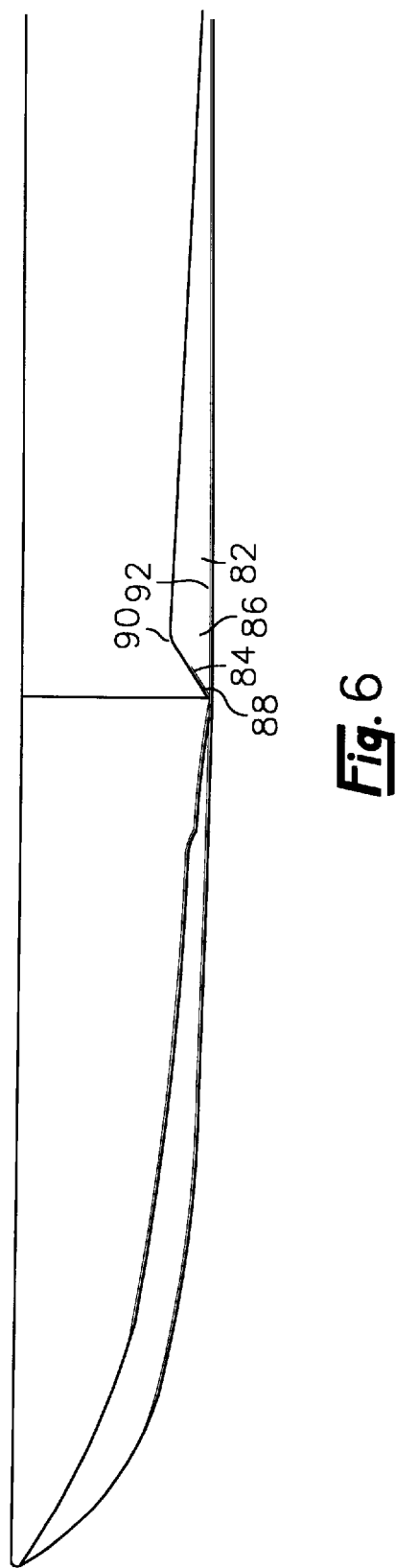
FIG 6. is a cut away side view of an embodiment having a sloped transition region.

FIG. 6 clearly depicts a cut away side view of a vessel having an air recess 82 with a sloped leading edge 84. A straight line drawn from a lowest point 88 of the leading edge 86 to a highest point 90 of the leading edge 84 forms an angle 86 with respect to the edge of a recess side hull 92. By selectively manipulating the angle 86, low speed performance can be dramatically improved without significant decreases in the vessel's top speed. This is largely due to the effect illustrated in FIG. 7.

FIG. 7(*a*) depicts a vessel 94 having an air cavity 96 with an unsloped leading edge 98. At low sub planing speeds before the air pressure in the air cavity has reached a level sufficient to force the water from the leading edge 98 as depicted in FIG. 7(*a*), a considerable amount of water turbulence 100 is created about the leading edge 98. Due to the power required to overcome the increased drag resulting from the high level of turbulence, the time required for the vessel 94 to reach a planing speed such as depicted in FIG. 7(*b*) is correspondingly increased. In addition, due to the increased level of turbulence at low speeds, the vessel will tend to wander off course and is hard to maneuver. However, an unsloped fairing 98 as shown in FIG. 7(*b*) does provide for a clean break between the air in the air cavity and the water 100 at high speeds.

An embodiment of the present invention having a sloped fairing 102 is depicted in FIG. 7(*c*). The sloped fairing 102 allows the water 100 to flow relatively smoothly over the vessel's 104 hull when the vessel's air cavity 106 is not pressurized at low speeds. The sloped fairing 102 also further minimizes blow throughs or venting at transition speeds. In addition, the additional friction incurred due to the sloped leading edge of the fairing 102 at higher speeds as shown in FIG. 7(*d*) has been experimentally determined to be insignificant when compared to the unsloped fairing 98. Thus, the low speed advantages of the sloped fairing 108 often outweigh the sloped fairing's high speed disadvantages. This is particularly true for larger vessels, such as yachts, ferries, and tour craft which are often more concerned with low speed performance and handling than the absolute highest top speed possible.

The present invention further comprehends that the sloped fairing 102 may be provided with a critical speed protrusion 110 which causes the water's surface 100 to form a boundary with the air cavity 106 at a certain location throughout a predetermined range of speeds as shown in FIG. 7(*e*). Thus, a cruising speed range is established between which the water/air boundary will be formed at the critical angle protrusion for any given air pressure in the air cavity 106. When operating within this cruising speed range, the critical speed protrusion 110 functions to facilitate separation of the water's surface from the hull of the vessel 104 and thereby decrease friction between the vessel and the water 100. The critical angle protrusion 110 further functions to control venting from the bow edge by establishing a firm seal at the water/air boundary. While a single critical angle protrusion is preferred, it is appreciated that the sloped fairing 102 may be provided with a series of critical angle protrusions which establish a series of cruising speeds.

Figure 8A:
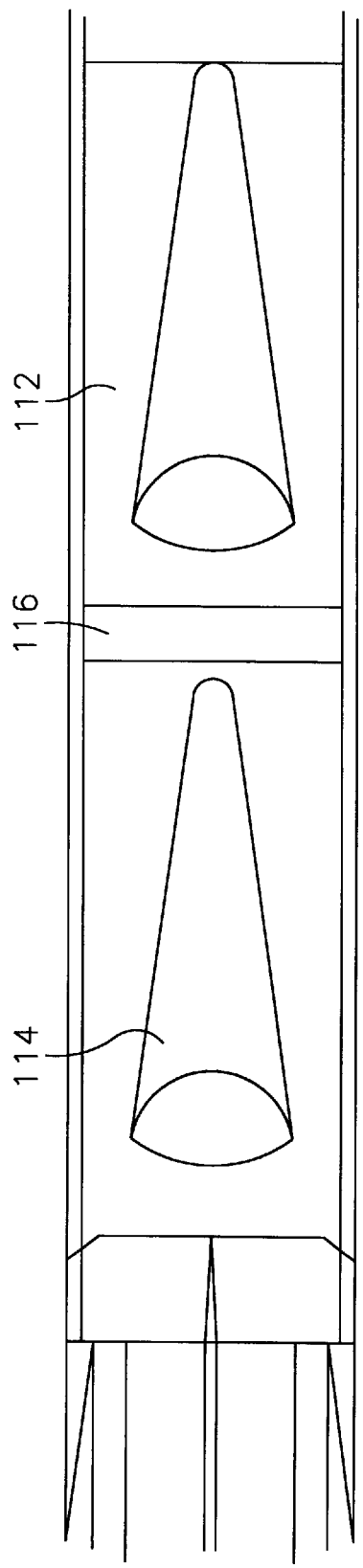
FIGS. 8(a) and (b) illustrate a bottom and a cutaway side view of an embodiment having bow and aft air cavities.

A bottom view of another embodiment of a hull configuration of the present invention having an aft air cavity 112 and a bow air cavity 114 is shown in FIG. 8(*a*). A separation portion 116 is located between the aft air cavity 112 and bow air cavity 114. At low speeds the separation portion 116 substantially prevents gas exchange between the aft 112 and the bow 114 air cavities. This allows the pressure to be independently adjusted in the aft 112 and the bow 114 air cavities at low speeds. Thus, the tendency of a boat having a rearwardly mounted engine to ride lower in the water in the aft region when taking off can be overcome by introducing a relatively high air pressure in the aft air cavity 112 and a relatively low air pressure in the bow air cavity 114 during take off. Adjusting the pressures in this manner causes the boat to reach a planing speed sooner and decreases the water resistance encountered during startup.

The separation portion preferably has a lower edge 118 that is positioned such that it is lifted up and separates from the water's surface at higher speeds as in the embodiment shown in FIG. 8(*b*). As is clearly illustrated in the side view of FIG. 8(*b*), a restriction area 120 containing high pressure gas moving at an increased velocity is created between the lower edge 118 of the separation portion and the surface of the water 126. Due to the direction of water flow, gas tends to flow from the bow air cavity 128 through the restriction area 120 to the aft air cavity 122. However, temporary increases in the aft air cavity 122 air pressure caused by conditions such as rough water or heavier aft loads may cause air to flow from the aft air cavity 122 through the restriction area 120 to the bow air cavity 128. Thus, the separation portion 116 may perform a cushioning and damping function under some circumstances. In addition, by not contacting the water's surface at higher speeds, the separation portion 116 produces less drag and is more efficient than a water contacting separation portion. The flow of air through the restriction area 120 can further be automatically manipulated through manipulations in the amount of air introduced into the bow 128 and aft 122 air cavities through their respective gas ducts 130 and 132.

In an especially preferred embodiment, the bow 128 and aft 122 air cavities and the separation portion 116 further function together to minimize the effects of venting at higher speeds. If air is vented from the bow cavity 128, the reduced gas pressure will cause the air cushion in the bow cavity 128 to vent. Gas will naturally attempt to move from the aft air cavity 122 through the restriction area 120 and into the venting bow air cavity 128. However, as the air cushion in the bow air cavity 128 vents, the bottom edge 118 of the separation portion 116 comes into contact with the water's surface and establishes a seal which substantially decreases the loss of air from the aft air cavity 122. Thus, a smaller portion of the hull's surface comes into contact with the water's surface and the above discussed lurching effects are diminished.

While the separation portion 116 has been discussed with respect to a bow and aft air compartment, it will be readily appreciated by one skilled in the art that the above discussed separation portion could also be utilized with longitudinal air cavities such as shown in FIG. 1. Furthermore, it is contemplated that the above discussed bow and aft compartments can also be utilized in conjunction with multiple longitudinal air compartments.

As discussed with respect to FIG. 8(*b*), a preferred embodiment of the present invention includes a divided air cavity having a forward air compartment and an aft air compartment. The forward air compartment is separated from the aft air compartment by a dividing section. As the boat begins to operate, pressurized air from a blower is forced into the forward and aft air compartments. Air may be introduced into the forward and aft compartments by a single air inlet in each cavity or through multiple air inlets in each cavity. The introduced air in the forward and aft air compartments separates portions of the boat's hull from the water's surface and, thus, decreases the friction between the boat hull and the water.

As the boat of FIG. 8(*b*) begins to move, the force of the water upon the portions of the boat hull contacting the water increases. Thus, the boat hull begins to rise out of the water thereby decreasing the surface area of the boat hull which is in contact with water. Furthermore, as the speed of the boat increases, the point at which the bow of the boat contacts the water moves farther aft. Thus, a high rate of speed might result in the front of the boat hull lifting out of the water to a point where the leading edge of the air cavity is lifted out of the water. At that point, the air cushion in the air cavity is released, and the inside of the air cavity comes into contact with the water. This venting of the air cushion results in a dramatic and rapid increase in the footprint of the boat and causes the boat to slow down.

Figure 8B:
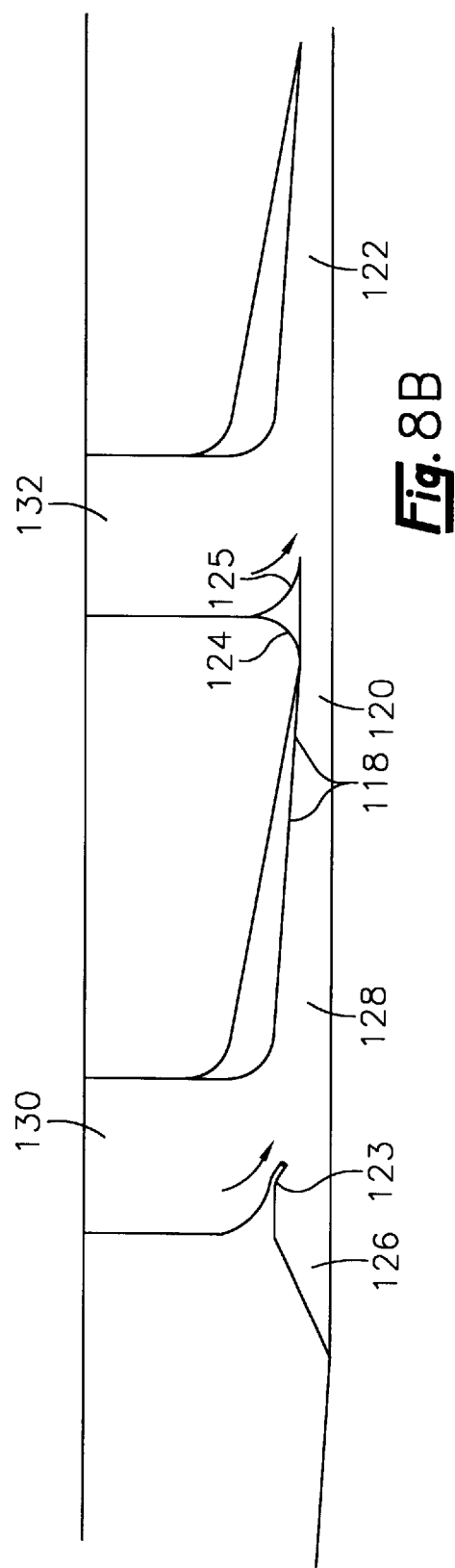

By maintaining multiple air cushions separated by dividers perpendicular to the direction of motion, the present invention minimizes the amount of air which escapes under the above described venting situation. For example, when a boat having a hull as shown in FIG. 8(b) speeds up the footprint of the boat hull in the water begins to decrease. When the boat hull rises out of the water enough to expose the forward cavity, the supporting gas in the forward air cavity is released and the footprint of the boat in the water increases. However, the dividing section prevents the air from the aft gas compartment from escaping. Thus, the increase in the size of the boat's footprint and the corresponding increase in drag is reduced by the presence of the dividing section. It will be readily appreciated by one skilled in the art that multiple air compartments may be established by providing multiple dividing sections in the hull to further limit the amount of air which escapes under the high speed fault condition discussed above.

In an especially preferred embodiment of the present invention, the multiple transverse air compartments have separate air vents and pressure controls that allow an operator of the surface effect vessel to independently adjust the air pressure in the compartments. Allowing independent control of the air pressure allows the operator to compensate for a number of undesirable situations. As previously discussed, one such situation occurs upon start up of the surface effect vessel. When the surface effect vessel begins to move, the aft of the vessel is typically resting lower in the water due to the increased amount of weight in the aft section. This increased weight is often due to the placement of the engine and/or the blowers near the aft of the vessel. Because the aft portion of the vessel is riding lower in the water, the vessel will tend to take off slowly until the force of the water on the hull causes the aft portion of the boat to rise and the bow drops. This condition is commonly referred to as the vessel going over the hump or planing out. The present invention minimizes this effect by allowing an operator the vessel to increase the air pressure in the aft most air chambers relative to the bow air chambers. The increased air pressure in the aft compartments causes the aft section of the surface effect boat to rise much earlier in the take off cycle. Thus, the surface effect vessel of the present invention planes out much earlier and a reduced amount of time and force are required to place the vessel in this condition. It will be appreciated that the present invention can also readily accommodate situations in which it is desirable to raise the bow of the surface effect vessel by increasing the air pressure in the bow air compartments relative to the aft compartments. Furthermore, the pressure in the bow and aft compartments can be automatically controlled by an autopilot type device which utilizes a gyroscope to sense the attitude of the vessel with respect to the horizon and maintains the attitude in accordance with a plurality of predetermined operating conditions.

The dividing portion between the multiple transverse air compartments is preferably constructed such that at moderate to high speeds a narrow air channel exists between the dividing portion and the water's surface. This air channel allows an amount of air to flow between the multiple chambers. Due to the direction in which the surface water is moving with respect to the vessel's hull and the direction in which air is introduced into the air compartment, air will tend to flow from the air compartments closest to the bow to the air compartments in the aft. Furthermore, because the air channel is narrower than the air compartments and forms a restriction in the air flow between the compartments, the air pressure in the air channel will be higher than the air pressure in the air chambers. This high pressure in combination with the direction of flow of the air from the bow sections to the aft sections, tends to minimize air flow from the aft chambers to the bow chambers. In addition, if the bow chamber was to vent and cause the bow air cushion to temporarily collapse, the hull will fall toward the water until the dividing portion comes into contact with the water's surface. The dividing portion will then function as a seal to prevent the aft air compartment from venting through the bow air compartment. Thus, the dividing portion helps minimize venting of the air cushions without out adding drag to the hull by being in contact with the waters surface at relatively higher speeds. While the above discussed dividing portion is designed not to be in contact with the water's surface at all times, particular embodiments of the present invention, wherein it is desired to substantially prevent gas exchange between the air compartments, may utilize dividing portions that are designed to be in substantial contact with the water's surface throughout the vessel's speed range. In addition, the present invention recognizes that a dynamic sealing member may be placed on the bottom edge 118 of the separation portion 116 such the size of the restriction area 120 may be automatically or manually adjusted by an operator of the vessel. By controlling the size of the restriction area 120 with a dynamic sealing member, an operator of the vessel can control the pressure differential between the bow and aft air compartments.

Another problem encountered with surface effect vessels is the tendency for water to be forced into the air inlets or gas ducts when the hull is forced against the water's surface. Thus, to prevent water from being forced into the air vents when the air cushion collapses and to direct the flow of air from the vents toward the aft of the surface effect vessel, air flow direction protrusions 123 and 125 are preferably provided on the bow side edges of the gas ducts 130 and 132 shown in FIG. 8(b). Preferably, the gas ducts, or air vents, 130 and 132 are located in the bow side portions of the air chambers. Thus, the air flow direction protrusion 125 for the aft side air compartment may be placed on the aft side of the bottom edge 118 of the separation portion. While the above discussed gas duct placement is preferred, it is appreciated that the gas ducts can be placed in any location inside the air compartments.

It will be appreciated that the speed at which the walls of the forward air compartment will be separated from the water causing the air cushion to vent depends upon the placement of the forward air cushion. It will further be appreciated that the effect of the loss of air pressure in the forward compartment will depend upon the size of the forward compartment in relation to the size of the aft compartment. In order to maximize the effectiveness of the multiple air compartments, the present invention comprehends an embodiment wherein a separation portion, such as separation portion 116 in FIG. 8(a) can be manually or automatically adjusted to a farther forward or farther aft position. Such an adjustable separation portion 116 allows a user of the boat to adjust the relative sizes of the forward and aft air compartments to compensate for varying conditions. Thus, the separation portion of the present invention provides a substantial benefit over the prior art.

As previously discussed with respect to the multiple transverse air compartments, the present invention also comprehends that the dividing portion between the longitudinal air compartments shown in FIG. 1 can be mounted on the hull such that the relative sizes of the port side and starboard side longitudinal air compartments can be adjusted by an operator of the vessel.

As previously discussed with regard to FIGS. 7(a–e), another improved feature of the surface effect vessel of the present invention resides in the leading bow side edge of the air compartments. Providing a leading bow side edge that is roughly perpendicular to the water's surface improves the high speed performance of the craft by providing a cutting edge which facilitates separation of the water surface from the hull. However, at lower speeds, water will tend irregularly rise up around the perpendicular leading edge and create a turbulent water area which leads to decreased stability and control of the vessel. Thus, the vessel tends to wander of center and constant course corrections are required. This highly turbulent back flow also tends to result in increased resistance to forward motion at speeds lower than the planing speed of a vessel. While the design of the hull of a vessel dramatically influences the planing speed of the vessel, a typical planing speed is about 8 knots.

In addition to the above discussed problems, a substantially perpendicular water separation fairing may cause so much turbulence and increased resistance that the engines of the vessel are unable to produce enough power for the vessel to get over the hump and attain its planing speed and overcome the turbulence. Thus, the low speed hydrodynamics of the hull bottom are critical if efficiency and straight line tracking of the vessel is to be maintained.

In order to provide the surface effect vessel of the present invention with improved low speed handling characteristics, the leading edge of the air compartments is sloped upward from the waters surface at an angle less than 90degrees to form a water separation fairing. Preferably the angle of the slope of this edge is less than 70 degrees. However, it is appreciated that the most desirable angle for the separation fairing will depend upon factors such as the weight of the vessel and its desired cruising speed. The sloped fairing angle of the present invention improves the transition between the water supported and air supported sections of the hull of a surface effect vessel.

The sloped leading edge of the air compartments also allows water to flow smoothly into the air chamber and past the air vents without creating a substantial amount of drag producing turbulence at low speeds. In addition, a separation protrusion is preferably provided on the upwardly sloping hull surface in order to facilitate separation of the water surface from the hull surface at higher speeds. Thus, the hull configuration of the present invention improves low speed performance without significantly affecting high speed performance. Therefore, a surface effect vessel having a sloped fairing angle is adapted to provide a quality ride as opposed to an absolute highest possible top speed such as would be desirable for a racing boat.

As discussed with respect to FIG. 7(e), the present invention further comprehends a critical angle protrusion placed on the upwardly sloping leading section of an air cavity. As the boat begins to move forward, water flows along the upwardly sloping edge of the air cavity until it reaches a point at which the water surface parts from the surface of the boat hull in the cavity. The point at which the water separates from the boat hull depends upon a number of factors such as the speed of the boat, the slope of the leading edge of the cavity and the air pressure injected into the cavity. Because the water coming into contact with the boat hull causes drag, it is desirable have the water separate from the hull as quickly as possible.

The present invention facilitates the separation of the water from the leading edge by placing a critical angle protrusion along the upwardly sloping edge at a point at which it is desired have the water separate from the hull. This protrusion results in an operating range over which the water will separate from the hull at the same position. This provides for a more constant ride quality in this range of speeds. Thus, the critical angle protrusion of the present invention provides a substantial improvement over the prior art.

Figure 9:
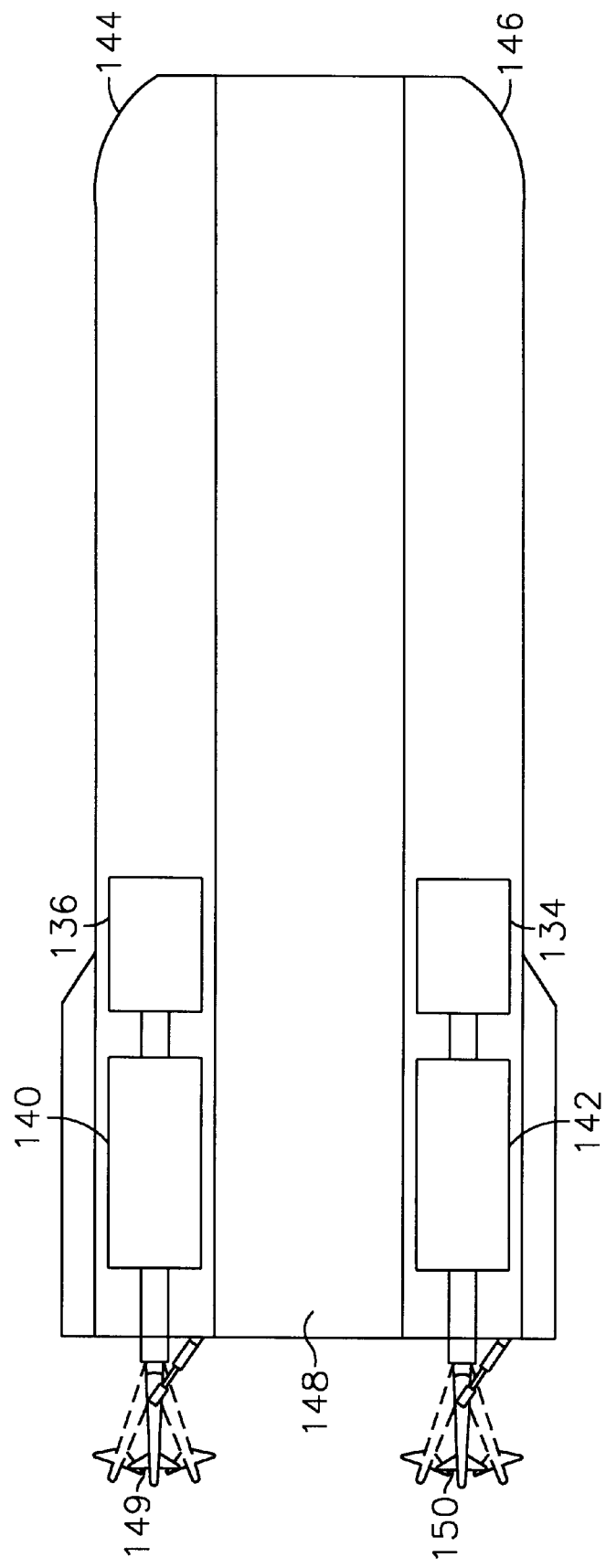
FIG. 9 shows a top view of a preferred blower and engine arrangement in accordance with the present invention.

Another aspect of the present invention resides in the placement of the engines and the blowers. For many types of boating applications, the most desirable location on the boat is often in the middle of the aft deck. In order to maximize the amount of available deck space in this aft area, preferred embodiments of the present invention place the blowers to the sides of the vessel's hull. Such a blower placement leaves the aft deck open for activities such as fishing. Ducting may be used to direct the air from a side mounted blower to the air cavity or cavities. In a two-hulled catamaran-like embodiment as shown in FIG. 9, dual blowers 134 and 136, one placed to each respective side of the hull, are preferred. This dual blower approach avoids the disadvantages of placing a single blower in the center of the aft portion of the hull and avoids any weight distribution problems incurred from placing a single blower to one side or the other. While a catamaran structure is depicted in FIG. 9, the present invention is equally applicable to multi hulled structures such as a trimarans.

FIG. 9 also depicts a preferred engine 140 and 142 placement of the present invention. The engines 140 and 142 are preferably positioned in close proximity to the blower's 134 and 136 in a manner that allows the blowers 134 and 136 to be efficiently coupled to the engines 140 and 142. In addition, the placement of the blowers 134 and 136 and the engines 140 and 142 in the bottom of the hulls 144 and 146 frees up the deck space on an aft portion 148 of the vessel. Furthermore, the placement of the blowers 134 and 136 and the engines 140 and 142 in the bottom of the hulls 144 and 146 provides the vessel with a low center of gravity for increased stability and an improved weight distribution. With such an engine placement, drive props 149 and 150 may be directly and inexpensively coupled to the engines 140 and 142 and transmissions when the engines are positioned as shown in FIG. 9. Thus, the engine and blower placement of FIG. 9 is preferred because it provides a number of advantages over the prior art. However, it is appreciated that many aspects of the present invention can also be realized in conjunction with a vessel having the blowers and engines mounted midship or in the bow of the vessel.

Figure 10:
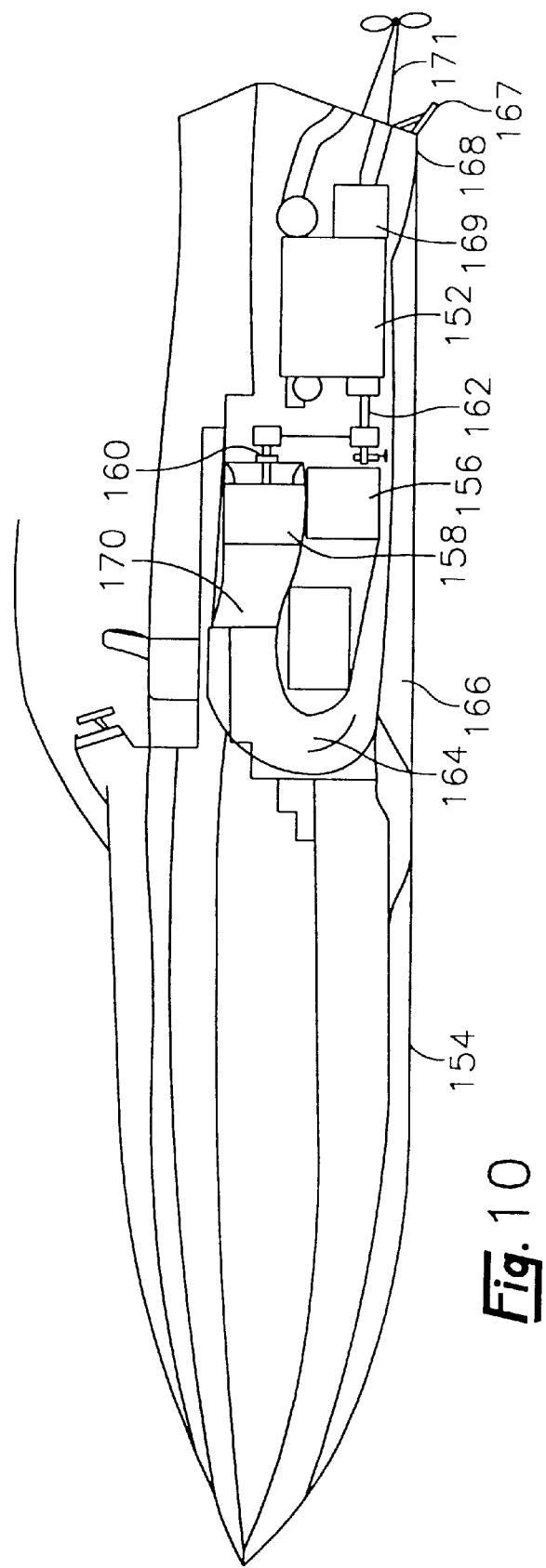
FIG. 10 is a cutaway view of a surface effect vessel having a preferred blower, engine and gas duct arrangement.

FIG. 10 shows a cut away view of a surface effect vessel having an alternative blower placement in accordance with the present invention. The engine 152 is placed towards an aft region of the vessel 154. The blower 158 is positioned with the blower's drive shaft 160 running approximately parallel to the engine's drive shaft 162. As discussed above, the blower 158 placement shown in FIG. 10 allows an inexpensive belt type coupling to be used between the engine 152 and the blower 158. In addition, placing the engine 152 and the blower in close proximity minimizes the amount of noise reduction shielding that needs to be employed to allow the vessel to operate at a comfortable noise level.

Yet another preferred feature of the present invention is also depicted in FIG. 10. The air passage 164 from the blower 158 to the air cavity 166 introduces air into the cavity 166 with an afterward direction of motion. A duct air flow director 164 can further be utilized to facilitate introduction of air with an aftward direction of flow. In addition, the duct air flow director 164 can further be configured to minimize the introduction of water into the duct when the vessel is operating in reverse or when the air cushions vent as a result of heavy wave impacts.

Experience has shown that introducing the air in this manner, develops forward thrust and establishes a predominately bow to aft airflow in the air cavity 166. This bow to aft airflow may increase the amount of air which escapes from the aft seal 168 of the air cavity 166. However, due to the weight distribution of a typical surface effect vessel in motion, the aft sealing region 168 is often one of the best sealing regions of the air cavity 166. In addition, the backward curve in the air passage 164 minimizes the amount of water which is forced into the air passage 164 when the air cushion in the air cavity 166 collapses or vents. The present invention also comprehends the use of a flapper door 170 that is biased shut or responsive to a reverse flow of air or water to further protect against the introduction of water into the blower 158.

Introducing air into the air cavity with an aftward direction of flow also helps reduce friction by shearing away wave crests in the air cavity 166 that come into contact with the hull. In rough water, the crest of waves in the air cavity 166 may come into contact with the hull. The increased contact between the water's surface and the hull results in increased friction which slows down the vessel and decreases the ride quality. However, introducing pressurized air into the air cavity 166 with a bow to aft motion creates a forced bow to aft air flow. This air flow will tend to shear away water which comes into contact with the vessel's hull above the air cavity 166. Thus, providing the air cavity 166 with a bow to aft air flow improves the performance of the surface effect vessel.

The air/water seal in the aft sealing region 168 can be further maintained by the provision of an adjustable hook angle protrusion 167. The adjustable hook angle protrusion 167 can be adjusted downward to function as a trim tab at low speeds to facilitate lifting of the aft region. At higher speeds the adjustable hook angle protrusion functions as a dynamic sealing member that allows an operator of the vessel to control the water/air seal in the aft sealing region 168.

While not shown in FIG. 10, it is appreciated that if a strong enough air pressure producing means, such as a jet engine, is utilized instead of the engine 152 and blower 158 combination shown, the forward thrust generated due to the direction in which the air is introduced into the air cavity 166 will be sufficient to propel the vessel across the water's surface. In fact, the blower 158 may be the only means by which the surface effect vessel generates thrust. However, the use of jet propulsion may dictate that the interior of the air cavity 166 be constructed such that it can handle the high temperature exhaust or thrust typically generated by a jet engine. In an embodiment as discussed above, the dual longitudinal air cavities 166 may be utilized such that the vessel can be steered by varying the amounts of air introduced into the respective longitudinal air cavities. Similarly, the air pressure under the respective hulls of a catamaran type embodiment may be varied to effectuate steering.

In a most preferred embodiment, the surface effect vessel is equipped with a multi speed transmission 169 coupled to a surface drive prop 171. The multi speed transmission 169 provides the vessel with low speed acceleration and a high top speed. In addition, the multi speed transmission 169 allows a larger more efficient surface drive prop 171 to be used for any given engine 152 size.

As discussed above, blower placement can influence the escape of air from an air cavity in a surface effect boat hull. Blowers that are positioned in a manner such that the air is blown into the air cavity at an angle tend to force an increased amount of air out of the air cavity in a particular region. Therefore, in an alternative embodiment, the present invention provides a blower arrangement such that the air is delivered in the air cavity substantially perpendicular to the water surface. Such a configuration causes the air to be evenly distributed in all directions and contributes to the overall efficiency of the surface effect vessel. In addition, such a blower placement provides a small amount of additional lift to the vessel. A downward aimed blower also tends to create a depression area in the water's surface. This depression can be positioned to counter a rebound hump that may be created by water rising as it passes the bow most seal of the air cavity. It is appreciated that a wide variety of pressurization systems could be used in accordance with the present invention. These types include but are not limited to centrifugal, axial ducted fans, jet engines, etc.

FIGS. 11(a) and (b) depict a preferred transom and prop configuration for a surface effect vessel in accordance with the present invention. In particular, FIG. 11(a) shows the transom 174 of a surface effect vessel having a shallow dual inverted V configuration 172 with a center mounted surface drive prop 176. As previously mentioned, surface effect vessels tend to allow air to escape from the transom region of the vessel. Introducing changing amounts of air in an unpredictable manner around a prop may cause the prop to cavitate or slip excessively in the water. The dual inverted V configuration 172 of FIG. 11(a) channels air escaping from the aft of the vessel towards the apexes 172 of the dual inverted V hull configuration. Placing the apexes 172 to the sides of the surface drive prop 176 channels escaping air away from the prop 176. Thus, the amount of air around the prop 176 will not depend as heavily upon the varying amount of air escaping from the transom region of the boat. Thus, a vessel having the dual shallow inverted V hull configuration and prop placement of FIG. 11(a) will exhibit more consistent and predictable acceleration and cruising speed characteristics.

The hull configuration of FIG. 11(a) also allows the engine 178 of the surface effect vessel to be placed low in the hull between the inverted V's. Such an engine placement provides an advantageous weight distribution, minimizes the required height of the inner deck and transom 174, and frees up space toward the rear of the vessel.

FIG. 11(a) also illustrates cornering chines 173 provided on the side hulls 175. The cornering chines 173 run along the sides of the side hulls 175 for a portion of the vessels length. The cornering chines 173 act upon the water around the side hulls 175 to produce a stabilizing force that minimizes the amount which the surface effect vessel will roll during a turn. Thus, the cornering chines 173 also minimize the likelihood that the side hulls 175 will drop into the water as the edges 175 dig into the water's surface during hard turns. In addition, the cornering chines 173 act as spray rails which prevent water from spraying onto the vessel. Furthermore, while the preferred embodiment has the cornering chines 173 positioned on the side hulls, it is appreciated that alternative placements of the cornering chines 173 may utilized.

Figure 11:
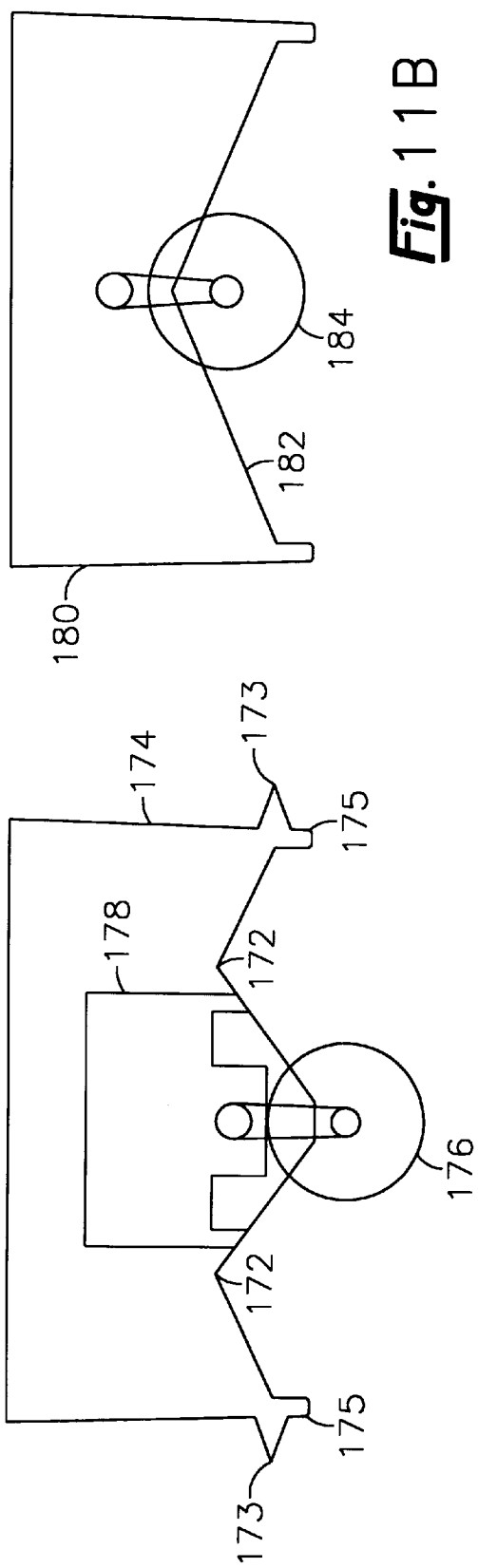
FIGS. 11(a) and (b) depict preferred transom configurations of the present invention.

Turning now to FIG. 11(*b*), an alternative transom and surface drive configuration of the present invention is shown. In FIG. 11(*b*), the transom 180 consists of a single inverted-V configuration 182. Placing the apex of the inverted-V 182 and the drive prop 184 in the center of the transom 180 directs air escaping from the transom 180 toward the drive prop 184. This escaping air flow lubricates the drive prop 184 and reduces the start up friction. Thus, embodiments where an initial reduced engine load is desirable and a degree of cavitation is acceptable utilize the embodiment shown in FIG. 11(*b*).

Surface drives such as shown in FIGS. 9, 10 and 11(*a*) and (*b*) are the preferred means of propulsion in accordance with the present invention. Surface drives are preferred because their surface piercing propellers reduce underwater appendage drag in relation to submerged propeller drive systems. The reduced drag results in a higher overall fuel economy and top speed. The present invention further comprehends the use of horizontally and vertically adjustable surface drive shafts as well as the use of enclosed tunnel surface drives. Adjustable surface drives increase steering control and improve maneuverability. In addition, the surface drives may be caged or enclosed for safety and aesthetic considerations. While a surface drive system is discussed and shown as the preferred method of propulsion, it is readily appreciated that the improved hull configuration of the present invention can be implemented with any of the wide variety of propulsion systems available such as conventional shaft drives, jet pumps, paddle wheels, outboards, stem drives, propeller fans, jet thrust, etc.

The present invention further comprehends the use of a variety of different props 176 in conjunction with a surface effect vessel. One such prop which has been determined to be particularly effective when used in conjunction with the surface effect vessel of the present invention is a variable pitch prop. Variable pitch props allow the thrust and resistance of the prop to be varied by adjusting the pitch of the prop's blades. Surface effect vessels tend to experience widely varying degrees of water resistance due to variations in the condition of the air cushion. Providing a manually or automatically adjustable variable pitch prop allows a user to rapidly compensate for varying conditions such as rough seas or venting air cushions which are particularly deleterious to surface effect vessels as compared to standard type vessels. In addition, a variable pitch can be used to provide a reversing function without the use of a gear box. Thus, a number of unappreciated advantages are obtained by utilizing a variable pitch prop in conjunction with a surface effect vessel. Therefore, the present invention has an embodiment wherein the prop 176 is a variable pitch prop.

Surface effect vessels tend to suffer from steering problems due to changes in the character of the air cushion. This is experienced by an operator as a constant need to provide course corrections. Dual counter rotating props produce a decreased amount of steering torque on the vessel as compared to single props. Given the particular steering problems encountered by surface effect vessels as discussed in more detail above, the added stability of a counter rotating prop is particularly advantageous in a surface effect vessel. Thus, the present invention has an embodiment wherein the prop 176 is a dual counter rotating prop.

Figure 12:
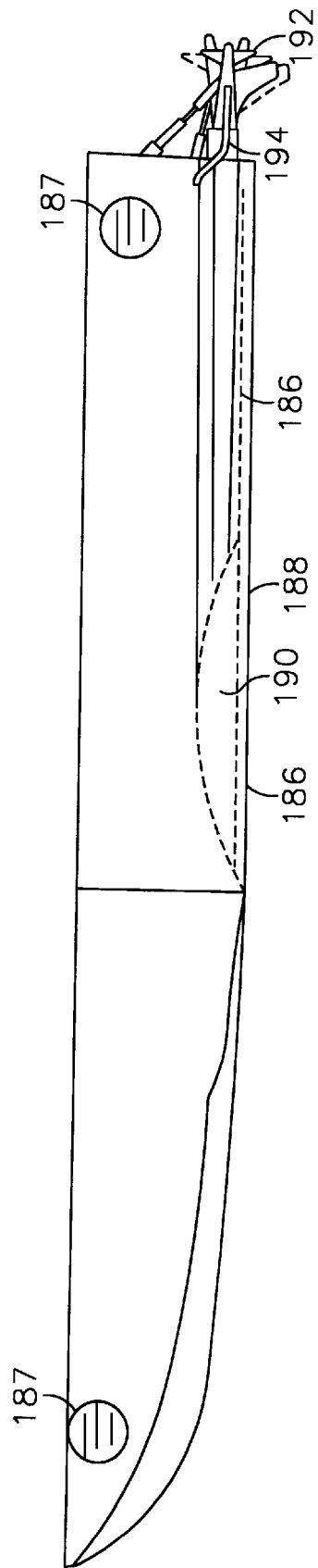
FIG. 12 is a side view of an embodiment of the invention having lubricating air vents.

FIG. 12 is a cutaway view of a surface effect vessel having lubricating air vents 186 arranged along the side hull 188 in accordance with a preferred embodiment of the present invention. The side hull 188 functions to contain the air cushion 190 under the surface effect vessel. However, it is been determined that allowing a predetermined amount of air to escape from the air cushion 190 through lubricating air vents 186 actually reduces the friction between the outside edge of the side hull 188 and the water by decreasing the surface area of the side hull 188 which is in contact with the water. The optimum size of the lubricating air vents 186 depends upon a number of factors such as the air pressure in the cushion 190, the number of lubricating air vents, the length of the side hull 188, the average running depth, etc.. Furthermore, while the lubricating air vents 186 are depicted in FIG. 12 as holes 186 in the side hull 188, it is appreciated that the lubricating air vents could be implemented as a series of slots or stepped edges in the side hull 188 which allow a controlled amount of lubricating air flow to escape from the air cushion 190.

FIG. 12 also illustrates another use of lubricating air in conjunction with the present invention. As discussed above, introducing air around a prop 192 reduces the amount of surface area on the prop that is in contact with the water and, thus, decreases the rotational friction of the prop. Thus, one embodiment of the present invention controllably introduces air around the prop 192 through the use of an air introduction passage 194. The air introduction passage 194 is responsive to operator controls to provide air to the prop 192. Thus, the operator can introduce air during start up to decrease the time required for the prop 192 to reach a desired speed. Because surface effect vessels already utilize some sort of air pressurization means, it is particularly cost effective to use air introduction means 194 in conjunction with a surface effect vessel.

One problem that is often encountered with large surface effect vessels is that they are hard to maneuver in tight spaces or at low speeds. Thus, the use of tugs or docking hands may be required to dock a large surface effect vessel. FIG. 12 illustrates an embodiment of the present invention utilizing docking vents 187. Surface effect vessels typically have powered blowers for generating the air pressure necessary to maintain the air cushions. A portion of this pressurized air can be efficiently diverted toward docking vents 187 such as shown in FIG. 12. By ejecting pressurized air through the docking vents a vessel such as that shown in FIG. 12 is able to move short distances in a direction completely perpendicular to its normal direction of motion. This sideways motion is particularly beneficial for approaching a dock under crowded or cramped conditions. Furthermore, by adjustably controlling the amount of air vented from the different docking vents, the vessel can be made to turn in place without moving. Thus, the provision of docking vents 187 economically improves the low speed maneuverability of large surface effect vessels.

Figure 13:
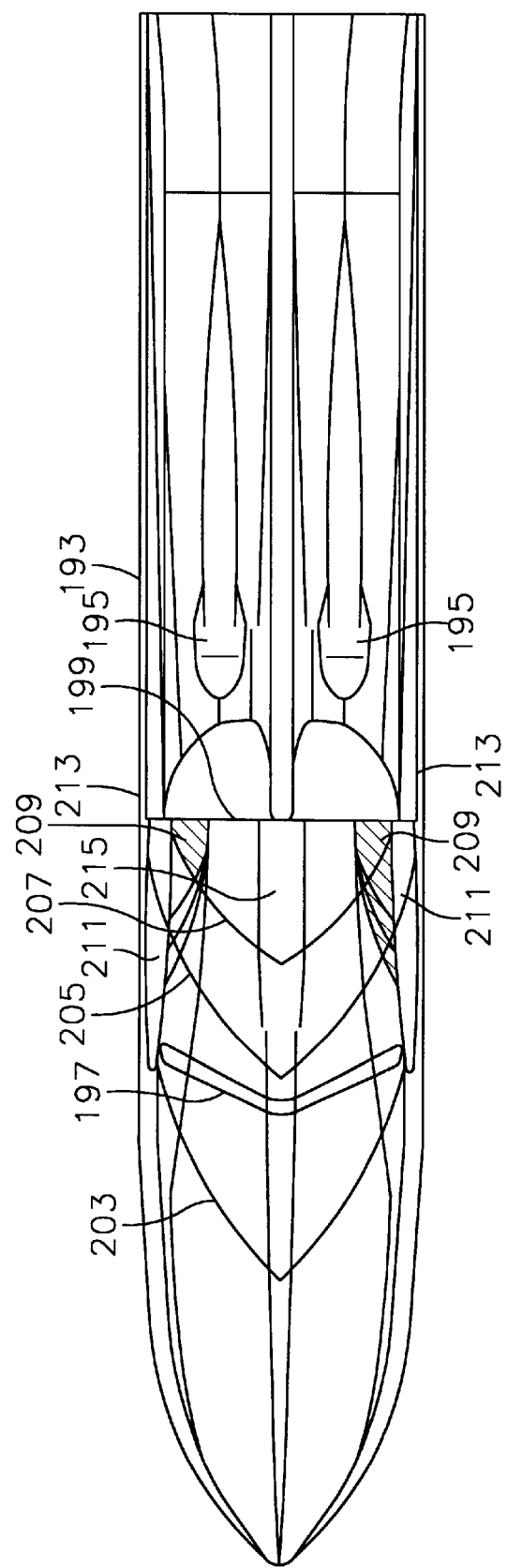
FIG. 13 is a bottom view of a mono hulled vessel having water redirecting portions.

FIG. 13 illustrates yet another use of lubricating air in accordance with the present invention. A bottom view of a vessel 193 having dual air cavities 195 and a forward seal lubricating air introduction vent 197 is shown. The air introduction vent 197 is a channel-like depression in the vessel's hull which runs from the center of hull to the sides of the hull. The air introduction vent 197 is located forward of the bow sealing region 199 of the air cavity 195. The air introduction vent 197 introduces a lubricating air flow forward of the air cavities 195 which reduces the friction of the hull against the water between the bow sealing region 199 and the air introduction vent 197. The size and depth of the air introduction vent 197 is optimally selected such that the amount of air introduced under the hull is large enough to reduce the friction between the hull and the water's surface yet small enough that it does not induce venting of air from the air cavities 195 nor interfere with the functioning of the water redirecting portions 211.

The functioning of the vessel 193 can be best understood with reference to the foot print lines 203, 205 and 207 which represent the portions of the bow of the vessel 193 in contact with the water's surface at different speeds. For example, when the vessel 193 is resting or moving slowly in the water, footprint line 203 represents the water air boundary. As the vessel 193 gains speed, the amount of surface area of the hull in contact with the water's surface decreases to the amount represented by foot print line 205 and the edges of the air introduction vent 197 are exposed to the air. Due to the reduced pressure created in the air introduction vent 197 by the water rushing over its surface, air is sucked into the air introduction vent 197 at its edges and released under the hull. Thus, the amount of friction between the vessel 193 and the water's surface is reduced and the efficiency of the vessel 193 is corresponding increased. While a passive air introduction vent 197 is shown, it is readily appreciated that an active air introduction vent 195 that utilizes pressurized gas from a source such as the blowers of the surface effect vessel may be used such that the amount of air introduced can be manually controlled by an operator of the vessel 193.

FIG. 13 is also useful for illustrating the benefits of water redirecting portions 211 in conjunction with a single hulled vessel 193 having dual air cavities 195. As the speed of the vessel increases to the point that the foot print of the vessel 193 is represented by line 207, blow through areas 209 begin to be created between the side hulls 213 and the apex of the v-shaped hull 215. The water redirecting portions 211 create a directed water flow which collides with a water flow created by the apex 215 of the v-shaped hull acting on the water's surface. The collision of these water flows creates a turbulent water mass in the blow through areas 209 which prevents air from venting from the air cavity 195 through the blow through areas 209. Thus, the efficiency of the vessel 193 is improved.

Figure 14:
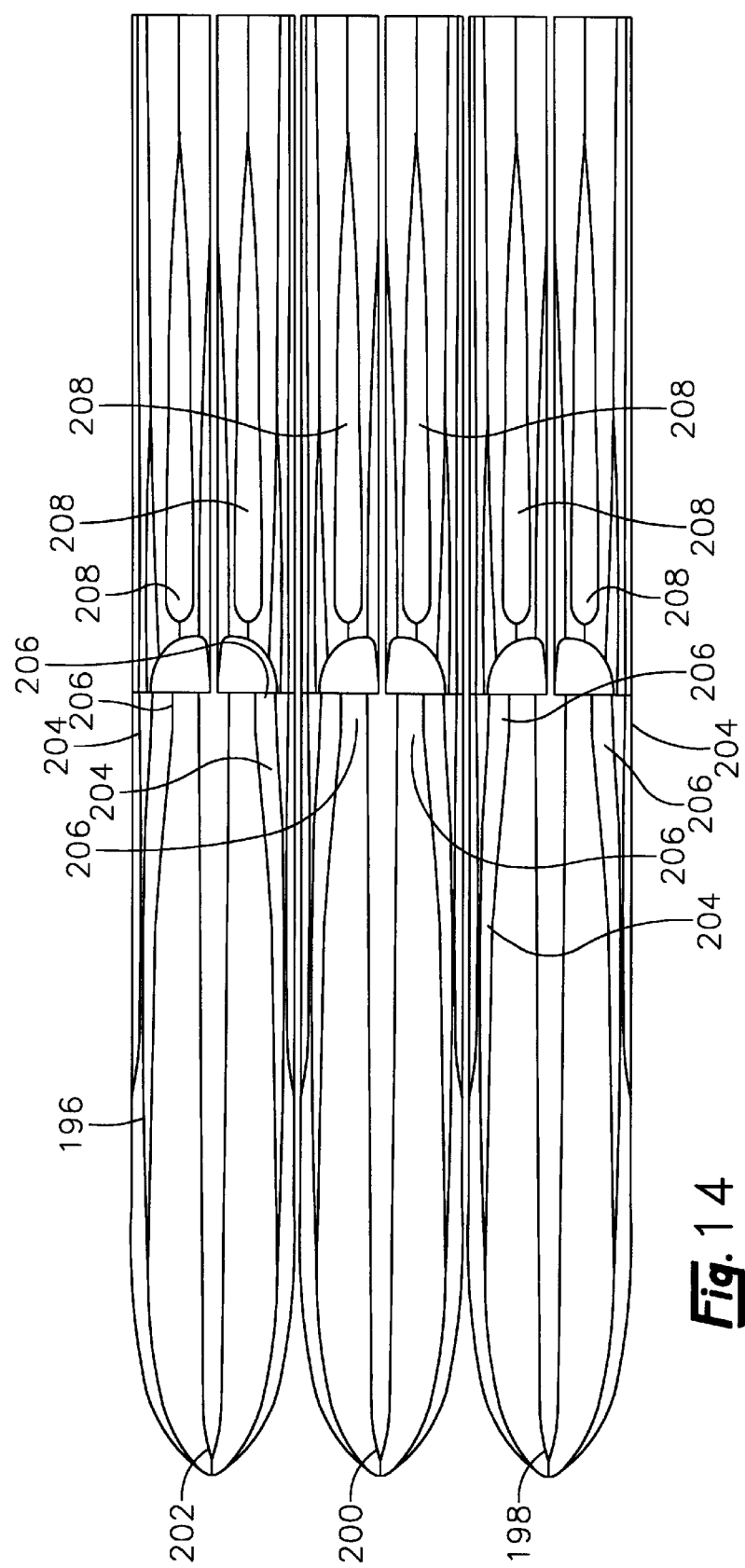
FIG. 14 is a bottom view of an embodiment having three adjacent hull structures.

One embodiment of the present invention which is particularly adapted for a large wide vessel such as a ferry is shown in FIG. 14. In such an embodiment, the surface effect vessel consist of three adjacent v-shaped hull sections 198, 200 and 202 six corresponding air cushions 208 located aft of the v-shaped hull sections. The v-shaped hull sections 198, 200 and 202 serve to cut through the waves and improve the ride quality of the vessel as previously discussed. Water redirecting portions 204 are shaped to direct turbulent water flows into the blow through areas 206 which form as the v-shaped hull sections act upon the water to lift the vessel with respect to the water's surface. Thus, the water redirecting portions 204 prevent the air cushions 208 corresponding to the v-shaped hull sections 198, 200 and 202 from venting pressurized gas through the blow through areas 206. Power and fuel must be expended to create the pressurized gas in the air cushions 208. Thus, by preventing the venting of pressurized gas, the above discussed bow configuration improves the fuel economy of the vessel.

Constructing the vessel 196 with multiple v-shaped hulls 198, 200 and 202 provides the vessel with the benefits of the invention discussed above. In addition, the provision of multiple v-shaped hulls also improves the shallow water performance of the vessel 196 by decreasing the draft of the vessel. In a large vessel, a single v-shaped hull would either extend so deep into the water that the vessel 196 could not be used in shallow water or have such a low dead rise angle that the vessel 196 would tend to ride up on the wave peaks and vent air from the air cushions. Furthermore, the provision of multiple v-shaped hulls decreases the size of the wake produced by the vessel 196. A small wake can be particularly beneficial for boats traveling in high traffic areas having wake restrictions. An example of such a boat would be a ferry operating in a congested harbor. A reduced wake may also be beneficial for boats traveling through environmentally managed areas where the shoreline erosion caused by large wakes is undesirable or prohibited altogether.

As previously discussed, the present invention comprehends an embodiment having bow 210 and 212 and aft 214 and 216 air compartments as shown in FIG. 15. The bow air compartments 210 and 212 are separated from the aft air compartments 214 and 216 by a separation portion 218 similar to the separation portion 116 shown in FIG. 8(a). Likewise, a dividing portion 220 separates the starboard bow air compartment 210 from the port air compartment 212 and the starboard aft air compartment 214 from the port aft air compartment 216. Air inputs are provided in each of the air compartments 210, 212, 214 and 216. The separation portion 218 and the dividing portion 220 function together such that the air pressure in the air compartments 210, 212, 214 and 216 are independently adjustable. The provision of an adjustable air pressure in the bow and aft air compartments, as well as the port and starboard air compartments, provides a number of benefits as discussed with regard to the previous embodiments. In addition, when one of the air compartments 210, 212, 214 and 216 vents, the separation portion 218 and the dividing portion 220 act to prevent the remaining air compartments from also venting. Thus, while an embodiment as shown in FIG. 15 increases the complexity of the hull design, many advantages are obtained by the provision of longitudinally divided bow and aft air compartments.

In view of the above explanation of the particular features of the present invention, it will be readily appreciated by one skilled in the art that the present invention can be usefully employed in a wide variety of embodiments. While certain embodiments have been disclosed and discussed above, the embodiments are intended to be exemplary only and not limiting of the present invention. The appropriate scope of the invention is defined by the claims set forth below.

I claim:

1. A vessel for moving across a water's surface, said vessel comprising a V-shaped hull for supporting said vessel upon said water's surface wherein said v-shaped hull has a gas cavity that is adapted to receive pressurized gas from a gas blower, said V-shaped hull further comprising:

air restricting side hull portions adapted to reduce gas loss from said gas cavity wherein said air restricting side hull portions extend substantially parallel to said vessel's direction of movement along said V-shaped hull; and water redirecting projections positioned on each side of said V-shaped hull wherein said water redirecting portions are adapted to direct a flow of water back toward a blow through area on said V-shaped hull such that a portion of said pressurized gas is prevented from venting from said gas cavity through said blow through area.

2. The vessel of claim 1 wherein said blow through area further comprises a pair of blow through areas located on opposite sides of said V-shaped hull adjacent leading edges of said air restricting side hull portions and said pair of blow through areas are lifted above said water's surface when said vessel reaches a critical speed.

3. The vessel of claim 1 further comprising cornering chines extending substantially perpendicular from said air restricting side hull portions.

4. The vessel of claim 1 wherein said water redirecting portions further comprise curved extensions of said air restricting side hull portions that create a turbulent water flow in said blow through area.

5. The vessel of claim 1 further comprising a dividing portion positioned in said gas cavity such that said gas cavity is divided into at least two longitudinal portions with respect to said vessel's direction of motion such that a release of pressurized gas from one of said two longitudinal portions will not cause a release of pressurized gas from said other of said two longitudinal portions.

6. The vessel of claim 1 wherein said vessel further comprises a second V-shaped hull having a gas cavity that is adapted to receive pressurized gas from a gas blower, said second V-shaped hull further comprising:

air restricting side hull portions adapted to reduce gas loss from said gas cavity wherein said air restricting hull portions extend substantially parallel to said vessel's direction of movement along said second V-shaped hull; and water redirecting projections adapted to direct a flow of water toward a blow through area of said second V-shaped hull such that a portion of said pressurized gas is prevented from venting from said air cavity.

7. The vessel of claim 6 further comprising a deck portion wherein said V-shaped hull is secured to said second V-shaped hull by said deck portion such that said vessel has a catamaran type configuration.

8. The vessel of claim 7 wherein a first gas pressure in said gas cavity in said V-shaped hull and a second gas pressure in said gas cavity in said second V-shaped hull are independently adjustable.

9. The vessel of claim 7 wherein said blower further comprises a first and a second blower and said first blower is located in said V-shaped hull and said second blower is located in said second V-shaped hull.

10. The vessel of claim 1 wherein said gas cavity has a leading edge region on a bow side of said gas cavity and said leading edge region is sloped with respect to said water's surface.

11. The vessel of claim 1 wherein said gas cavity is divided into an aft compartment and a bow compartment and said aft compartment and said bow compartment are separated by a separation portion.

12. The vessel of claim 11 wherein said aft compartment has a first inlet port for introducing pressurized gas from said blower into said aft compartment and said bow compartment has a second inlet port for introducing pressurized gas from said blower into said bow compartment and a first gas pressure in said aft compartment is controlled independently of a second gas pressure in said bow compartment.

13. The vessel of claim 11 wherein said separation portion is vertically positioned such that a restriction area whereby said aft compartment is placed in restricted gas flow communication with said bow compartment is formed between a lower surface of said separation portion and said water's surface when said vessel's speed surpasses a separation speed.

14. The vessel of claim 13 wherein an aft edge of said separation portion is curved.

15. The vessel of claim 12 wherein a gas pressure in said restriction area is higher than said gas pressure in said aft compartment and said bow compartment.

16. The vessel of claim 1 wherein said vessel is equipped with a surface drive shaft and prop coupled to a multi speed transmission.

17. The vessel of claim 16 wherein said vessel has gas introduction means for introducing gas in an area near said surface drive prop for reducing the start up resistance of said surface drive prop.

18. The vessel of claim 1 wherein said blower is in gas communication with said gas cavity through an air inlet port and said air inlet port is positioned in said gas cavity such that said pressurized gas is introduced into said gas cavity with a motion substantially parallel to said water's surface.

19. The vessel of claim 1 wherein said V-shaped hull has a dead rise angle greater than 26 degrees.

20. A deep V-hull configuration for a surface effect ship utilizing a cushion of pressurized air to reduce frictional forces acting between a water's surface and said deep V-hull configuration, said deep V-hull configuration comprising a longitudinal hull body having an air cushion recess for containing said cushion of pressurized air between a portion of said longitudinal hull body and said water's surface, and a transition area between a bow side edge of said air cushion recess and said longitudinal hull body wherein said hull body in said transition area slopes upward from the waters surface, and toward the aft of the longitudinal hull body at an angle less than 80 degrees.

21. The deep V-hull configuration of claim 20 further comprising a surface drive shaft coupled to a multi speed transmission mounted toward and aft end of said longitudinal hull body.

22. The deep V-hull configuration of claim 20 further comprising a critical angle separation protrusion running substantially perpendicular to said longitudinal hull body wherein said critical angle separation protrusion facilitates separation of said water's surface from said longitudinal hull body in said transition area at said critical angle separation protrusion when said surface effect ship's speed surpasses a desired planing speed.

23. The deep V-hull configuration of claim 20 further comprising a port water redirecting portion and a starboard water redirecting portion wherein said port and starboard water redirecting portions are located on said longitudinal hull body such that when said surface effect vessel reaches a speed such that said deep-V hull configuration has lifted said longitudinal hull body with respect to said water's surface to a point at which a port side edge and a starboard side edge of said air cushion recess will be lifted from said water's surface, said port water redirecting portion directs a turbulent water flow toward said port side edge of said air cushion recess and said starboard water redirecting portion directs a turbulent water flow toward said starboard side edge of said air cushion recess whereby said turbulent water flows substantially prevent a quantity of air from venting from said edges of said air cushion recess.

24. The deep V-hull configuration of claim 20 further comprising a second longitudinal hull body constructed similar to said longitudinal hull body and connected to said longitudinal hull body by a deck portion to form a catamaran type structure.

25. The deep V-hull configuration of claim 20, wherein said air cushion recess is divided into a bow and aft portion by a dividing portion having a bottom surface wherein said bottom surface of said dividing portion is disposed with respect to the water's surface such that at a predetermined speed said bottom surface separates from said water's surface to create a restricted air flow channel between said bow and aft portion of said air cushion recess.

26. The deep V-hull configuration of claim 25 wherein said dividing portion is constructed such that if air vents from said aft portion of said air recess said bottom surface of said dividing portion will come into contact with said water's surface and substantially prevent air from venting from said bow portion of said air recess and if air vents from said bow portion of said air recess said bottom surface of said dividing portion will come into contact with said water's surface and substantially prevent air from venting from said aft portion of said air recess.

27. The deep V-hull configuration of claim 20 further comprising air cushion recess sealing means for minimizing venting of pressurized gas from said air cushion recess wherein said air cushion sealing means allow a restricted amount of pressurized air vent to from said air cushion such that a lubricating airflow is created on a portion of said longitudinal hull body.

28. A vessel for moving across a water's surface, said vessel comprising a V-shaped hull for supporting said vessel upon said water's surface wherein said v-shaped hull has a gas cavity that is concave with respect to the water's surface and adapted to receive pressurized gas to receive from a gas blower, said V-shaped hull further comprising air restricting side hull portions adapted to reduce gas loss from said gas cavity wherein said air restricting side hull portions extend substantially parallel to said vessel's direction of movement along said gas cavity and wherein said air restricting side hull portions have lubricating air vents for producing a lubricating air flow between an outer edge of said air restricting side hull portions and said water's surface.

29. The vessel of claim 28 wherein said gas cavity has a leading edge region on a bow side of said gas cavity and said leading edge region is sloped with respect to said water's surface.

30. A catamaran boat having at least two hulls wherein said hulls further comprise:
a bow portion having a deep V-configuration with a dead rise angle greater than 26 degrees;
an aft portion wherein is defined an air cushion recess having a port side edge and a starboard side edge and said air cushion recess is further bounded by sealing sidewalls; and
water redirecting means for redirecting a turbulent water flow toward said port side edge and said starboard side edge of said air cushion recess.

31. The catamaran boat of claim 30 further comprising a leading edge region on a bow side of said air cushion recess such that when said catamaran boat is supported by water, said leading edge region is sloped with respect to said water's surface.

32. A surface effect vessel having a hull and an air compartment positioned under said hull wherein said air compartment is adapted to contain a supporting cushion of air, said surface effect vessel further comprising a separation portion positioned in said air compartment to divide said air compartment into first and second air compartments wherein when said surface effect vessel is traveling below a separation speed said separation portion is in contact with the water's surface such that said separation portion substantially prevents air flow between said first and second air compartments and wherein when said surface effect vessel is traveling above said separation speed said separation portion is substantially not in contact with said water's surface such that a limited gas flow is established between said first and second air compartments.

33. A vessel for moving across a water's surface, said vessel comprising a V-shaped hull for supporting said vessel upon said water's surface wherein said v-shaped hull has a gas cavity that is adapted to receive pressurized gas from a gas blower, said V-shaped hull further comprising:
air restricting side hull portions adapted to reduce gas loss from said gas cavity wherein said air restricting side hull portions extend substantially parallel to said vessel's direction of movement along said V-shaped hull and wherein said air restricting side hull portions have restricted air release means adapted to provide a lubricating air flow along an outer edge of said air restricting side hull portions such that friction between said outer edge of said air restricting side hull portions and said water's surface is reduced; and
water redirecting projections adapted to direct a flow of water toward a blow through area such that a portion of said pressurized gas is prevented from venting from said gas cavity through said blow through area.

34. A vessel for moving across a water's surface, said vessel comprising a V-shaped hull for supporting said vessel upon said water's surface wherein said v-shaped hull has a gas cavity that is adapted to receive pressurized gas from a gas blower, said V-shaped hull further comprising:
air restricting side hull portions adapted to reduce gas loss from said gas cavity wherein said air restricting side hull portions extend substantially parallel to said vessel's direction of movement along said V-shaped hull; and
water redirecting projections adapted to direct a flow of water toward a blow through area such that a portion of said pressurized gas is prevented from venting from said gas cavity through said blow through area wherein said water redirecting portions are controllable such that said water flow can be adjustably directed toward one of a multitude of blow through area locations.

35. The vessel of claim 34 wherein each blow through area location in said multitude of blow through area locations corresponds to a blow through area location when said vessel is moving at a predetermined speed.

36. A deep V-hull configuration for a surface effect ship utilizing a cushion of pressurized air to reduce frictional forces acting between a water's surface and said deep V-hull configuration, said deep V-hull configuration comprising a longitudinal hull body having an air cushion recess for containing said cushion of pressurized air between a portion of said longitudinal hull body and said water's surface, a transition area between a bow side edge of said air cushion recess and said longitudinal hull body wherein said hull body in said transition area slopes upward from the waters surface at an angle less than 70 degrees, and a port water redirecting portion and a starboard water redirecting portion wherein said port and starboard water redirecting portions are located on said longitudinal hull body such that when said surface effect vessel reaches a speed such that said deep-V hull configuration has lifted said longitudinal hull body with respect to said water's surface to a point at which a port side edge and a starboard side edge of said air cushion recess will be lifted from said water's surface, said port water redirecting portion directs a turbulent water flow toward said port side edge of said air cushion recess and said starboard water redirecting portion directs a turbulent water flow toward said starboard side edge of said air cushion recess whereby said turbulent water flows substantially prevent a quantity of air from venting from said edges of said air cushion recess.

37. A catamaran boat having at least two hulls wherein said hulls further comprise:
a bow portion having a deep V-configuration with a dead rise angle greater than 26 degrees;
an aft portion wherein is defined an air cushion recess having a port side edge and a starboard side edge and said air cushion recess is further bounded by sealing sidewalls;
a leading edge region on a bow side of said air cushion recess such that when said catamaran boat is supported by water, said leading edge region is sloped with respect to said water's surface;
a hook angle projection positioned in an aft region of said at least two hulls; and
water redirecting means for redirecting a turbulent water flow toward said port side edge and said starboard side edge of said air cushion recess.

* * * * *